(12) United States Patent
Okano

(10) Patent No.: US 7,965,455 B2
(45) Date of Patent: Jun. 21, 2011

(54) IMAGE PICKUP LENS AND IMAGE PICKUP APPARATUS

(75) Inventor: Hideaki Okano, Aichi (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 12/458,777

(22) Filed: Jul. 22, 2009

(65) Prior Publication Data

US 2010/0046090 A1 Feb. 25, 2010

(30) Foreign Application Priority Data

Aug. 22, 2008 (JP) ................................ 2008-214599

(51) Int. Cl.
*G02B 9/34* (2006.01)
(52) U.S. Cl. ........................................ 359/773; 359/715
(58) Field of Classification Search .................. 359/773, 359/715, 771–772
See application file for complete search history.

(56) References Cited

U.S. PATENT DOCUMENTS

| 7,274,518 B1 * | 9/2007 | Tang et al. ..................... 359/772 |
| 2004/0136097 A1 | 7/2004 | Park |
| 2007/0008625 A1 | 1/2007 | Park et al. |
| 2008/0180816 A1 | 7/2008 | Nakamura |

FOREIGN PATENT DOCUMENTS

| JP | 2002-365529 | 12/2002 |
| JP | 2002-365530 | 12/2002 |
| JP | 2002-365531 | 12/2002 |
| JP | 2004-004566 | 1/2004 |
| JP | 2006-267570 A | 10/2006 |
| JP | 2006-293324 | 10/2006 |
| JP | 2007-017984 A | 1/2007 |
| JP | 2007-219079 A | 8/2007 |
| JP | 2009-069193 A | 4/2009 |
| WO | WO-2008/078709 A1 | 7/2008 |

OTHER PUBLICATIONS

European Search Report issued Sep. 30, 2009 for corresponding European Application No. 09 25 1838.
Japanese Office Action issued Jun. 17, 2010 for corresponding Japanese Application No. 2008-214599.

* cited by examiner

*Primary Examiner* — Joseph Martinez
*Assistant Examiner* — James R Greece
(74) *Attorney, Agent, or Firm* — Rader, Fishman & Grauer PLLC

(57) ABSTRACT

An image pickup lens includes, in order from an object side to an image side, an aperture stop, a first lens element having a positive refractive power, a second lens element having a negative refractive power and a biconcave shape, a third lens element having a positive refractive power and a meniscus shape whose concave surface faces the object side, and a fourth lens element having a negative refractive power. In the image pickup lens, the following conditional expressions are satisfied, $$0.20 < f/|f2| < 0.9$$

$$vd1 - vd2 > 25$$

where f denotes the focal length of the entire lens system, f2 denotes the focal length of the second lens element, vd1 denotes the Abbe number of the first lens element, and vd2 denotes the Abbe number of the second lens element.

11 Claims, 23 Drawing Sheets

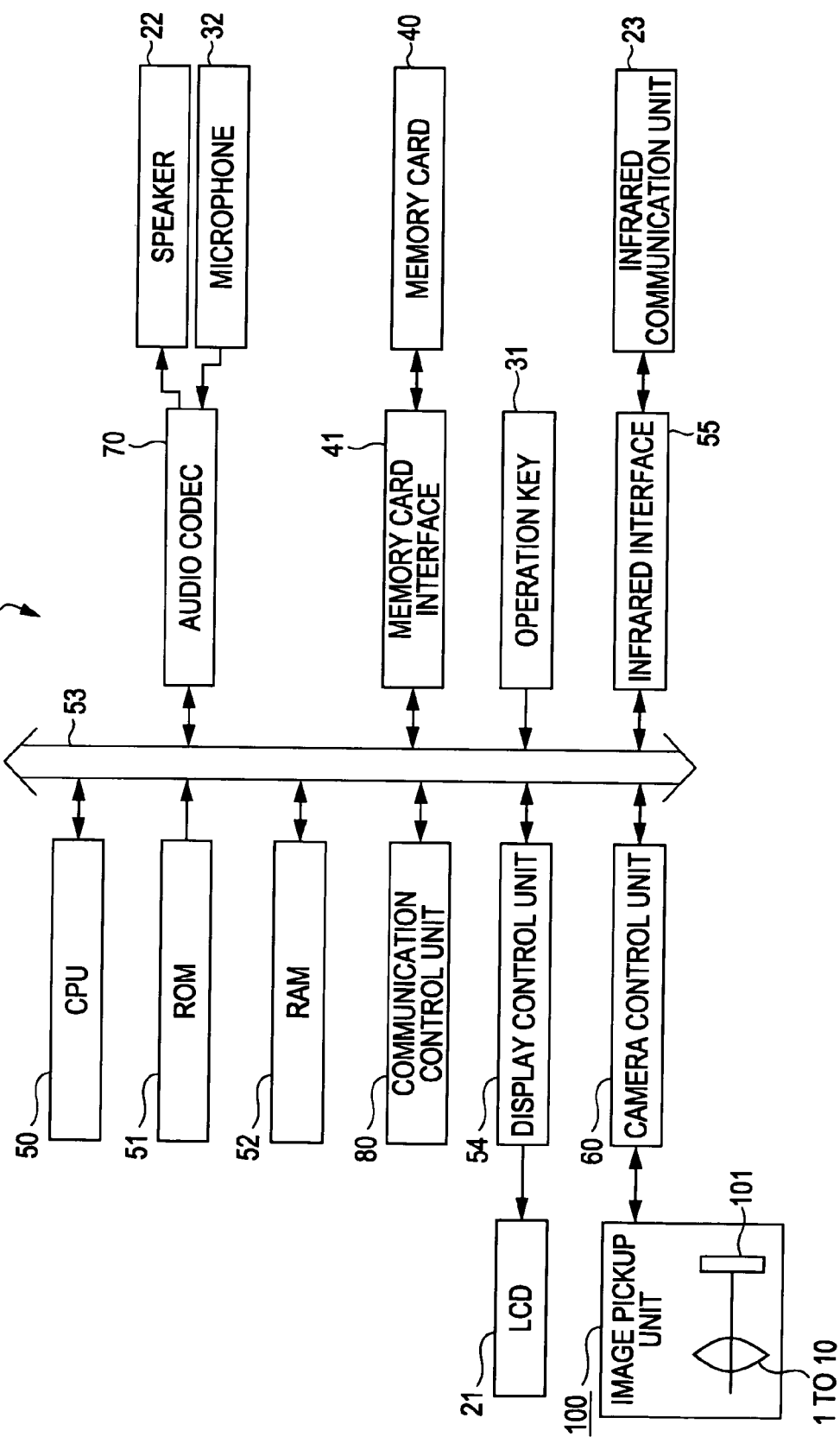

IMAGE PICKUP LENS AND IMAGE PICKUP APPARATUS

BACKGROUND OF THE INVENTION

1. Field of the Invention

The present invention relates to image pickup lenses and image pickup apparatuses, and more specifically to a technical field of an image pickup lens suitable for an image-pickup optical system included in an apparatus such as a digital still camera or a camera-equipped mobile phone having a solid-state image pickup device, and an image pickup apparatus including the image pickup lens.

2. Description of the Related Art

There are various image pickup apparatuses, including ones that are small in size and having solid-state image pickup devices, such as charge-coupled devices (CCDs) and complementary metal-oxide semiconductors (CMOSs). Examples of such image pickup apparatuses include a camera-equipped mobile phone and a digital still camera.

There has been an increasing demand for size reduction in such image pickup apparatuses. Accordingly, image pickup lenses to be included in these apparatuses are desired to be small with short total lengths.

Together with the size reduction of image pickup apparatuses such as a camera-equipped mobile phone, the numbers of pixels of their image pickup devices have also been increasing recently. Apparatuses including image pickup devices of megapixel or higher type are becoming mainstream. Accordingly, image pickup lenses to be included in such apparatuses are desired to have high lens performance so as to adapt themselves to the aforementioned image pickup devices having large numbers of pixels.

To provide a small, high-performance image pickup lens, three or more lens elements are desired to be included. Exemplary image pickup lenses each including three or more lens elements are disclosed in the following Japanese Unexamined Patent Application Publications: No. 2004-4566, No. 2002-365529, No. 2002-365530, No. 2002-365531, and No. 2006-293324.

SUMMARY OF THE INVENTION

The image pickup lens disclosed in Japanese Unexamined Patent Application Publication No. 2004-4566 includes three lens elements, and therefore is advantageous in reducing the total optical length.

In this image pickup lens, however, the three lens elements are insufficient for correcting chromatic aberration, when considering that a high resolution and reduction of chromatic aberration are to be realized so as to accommodate an increased number of pixels of the image pickup device. Therefore, it is difficult to realize the desired performance.

The image pickup lenses disclosed in Japanese Unexamined Patent Application Publications No. 2002-365529, No. 2002-365530, and No. 2002-365531 each include four lens elements, and aberrations occurring therein are corrected well. Instead, the image pickup lenses have long total optical lengths, preventing size reduction.

Moreover, in each of the image pickup lenses disclosed in Japanese Unexamined Patent Application Publications No. 2002-365529, No. 2002-365530, and No. 2002-365531, the refractive powers of the first and second lens elements are very strong. This increases manufacturing sensitivity and therefore reduces productivity. In particular, the strong refractive power of the second lens element makes it highly difficult to manufacture the entire lens system.

The image pickup lens disclosed in Japanese Unexamined Patent Application Publication No. 2006-293324 includes four lens elements and has high aberration correctability. Instead, the image pickup lens has a long total optical length, also preventing size reduction.

Moreover, a third lens element of the image pickup lens disclosed in Japanese Unexamined Patent Application Publication No. 2006-293324 has a biconvex shape, and aberrations occurring therein are difficult to correct, leading to high manufacturing sensitivity. In addition, because of the biconvex third lens element, ghosts produced by total reflection of marginal rays may be incident on the image pickup device and therefore significantly deteriorate image quality.

In view of the above, it is desirable that the present invention provide an image pickup lens and an image pickup apparatus maintaining the sizes thereof to be small and ensuring good optical performance accommodating an image pickup device having a large number of pixels.

According to an embodiment of the present invention, an image pickup lens includes, in order from an object side to an image side, an aperture stop, a first lens element having a positive refractive power, a second lens element having a negative refractive power and a biconcave shape, a third lens element having a positive refractive power and a meniscus shape whose concave surface faces the object side, and a fourth lens element having a negative refractive power. In the image pickup lens, the following conditional expressions are satisfied, $$0.20 < |f/f2| < 0.9$$

$$vd1 - vd2 > 25$$

where f denotes the focal length of the entire lens system, f2 denotes the focal length of the second lens element, vd1 denotes the Abbe number of the first lens element, and vd2 denotes the Abbe number of the second lens element.

Thus, in the image pickup lens, the second lens element has an appropriate refractive power, and good aberration correctability is provided.

In addition, the size of the image pickup lens is reduced, and good optical performance accommodating an image pickup device having a large number of pixels is assuredly provided.

In the image pickup lens according to the embodiment, it is preferable that the following conditional expression be satisfied, $$0.2 < |f1/f2| < 0.7$$

where f1 denotes the focal length of the first lens element.

With the image pickup lens also satisfying the foregoing conditional expression, the refractive powers of the first and second lens elements are prevented from becoming too strong, and good balance of refractive power is provided between the first and second lens elements.

In addition, good aberration correctability is provided, and the manufacturing sensitivity is reduced.

In the image pickup lens according to the embodiment, it is preferable that the aperture stop be positioned near the image side with respect to an apex of an object-side surface of the first lens element.

By positioning the aperture stop near the image side with respect to the apex of the object-side surface of the first lens element, part of the first lens element protrudes toward the object side with respect to the aperture stop.

Thus, compared to a case where the aperture stop is positioned near the object side with respect to the apex of the object-side surface of the first lens element, the amount of light to be incident on the first lens element increases.

In the image pickup lens according to the embodiment, it is preferable that both surfaces of the first lens element, both surfaces of the second lens element, both surfaces of the third lens element, and both surfaces of the fourth lens element be aspherical.

With the first, second, third, and fourth lens elements each having both surfaces thereof being aspherical, aberrations occurring in the respective lens elements are corrected well.

In addition, optical performance is improved.

According to another embodiment of the present invention, an image pickup apparatus includes an image pickup lens, and an image pickup device configured to convert an optical image formed by the image pickup lens into an electrical signal. The image pickup lens includes, in order from an object side to an image side, an aperture stop, a first lens element having a positive refractive power, a second lens element having a negative refractive power and a biconcave shape, a third lens element having a positive refractive power and a meniscus shape whose concave surface faces the object side, and a fourth lens element having a negative refractive power. In the image pickup apparatus, the following conditional expressions are satisfied, $$0.20 < f/|f2| < 0.9$$

$$vd1 - vd2 > 25$$

where f denotes the focal length of the entire lens system, f2 denotes the focal length of the second lens element, vd1 denotes the Abbe number of the first lens element, and vd2 denotes the Abbe number of the second lens element.

Thus, in the image pickup apparatus, the second lens element of the image pickup lens has an appropriate refractive power, and good aberration correctability is provided.

In addition, the size of the image pickup apparatus is reduced, and good optical performance accommodating an image pickup device having a large number of pixels is assuredly provided.

BRIEF DESCRIPTION OF THE DRAWINGS

FIG. 23 is a block diagram of the mobile phone.

DESCRIPTION OF THE PREFERRED EMBODIMENTS

Figure 1:
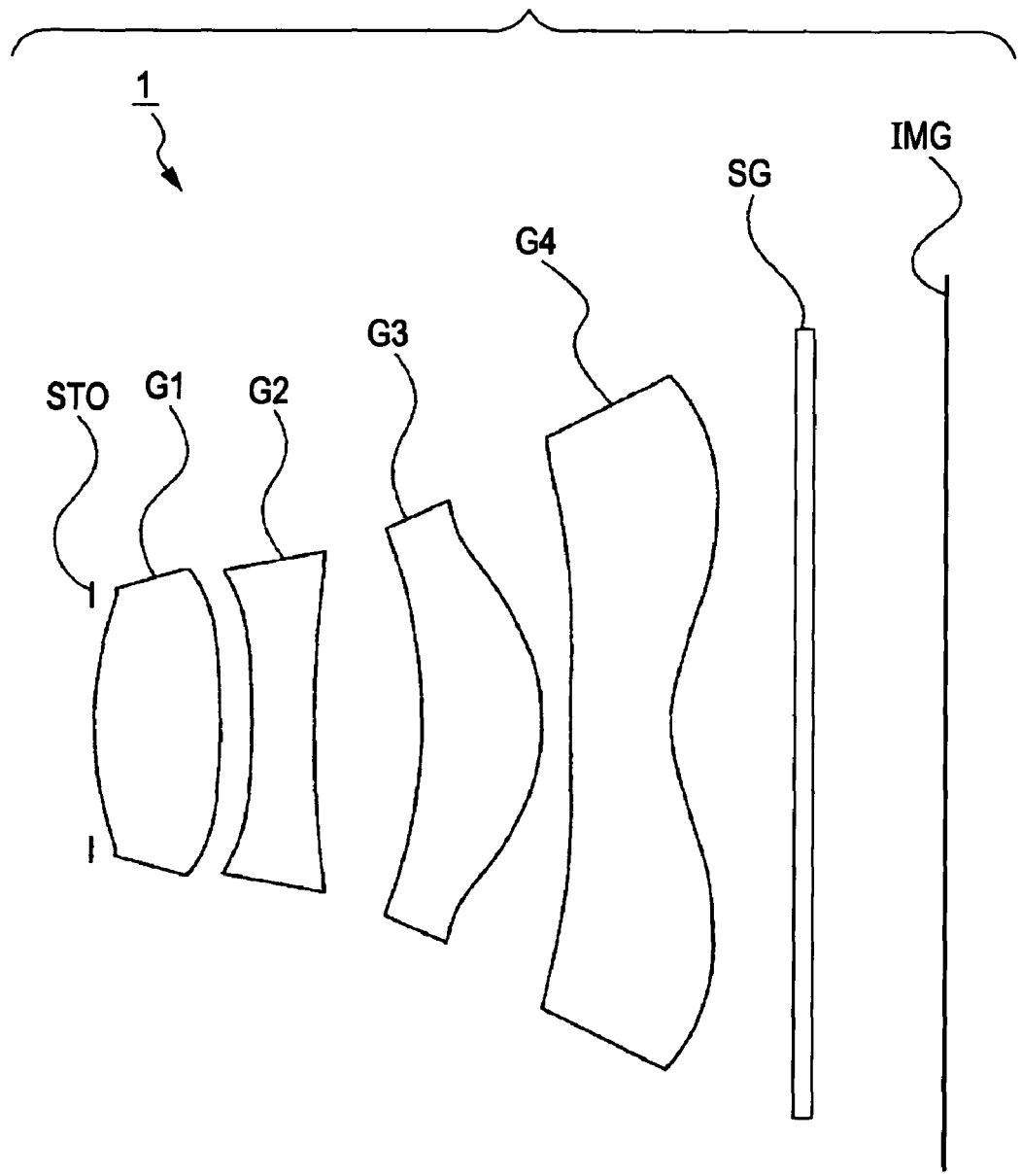
FIG. 1 shows, together with FIGS. 2 to 23, a general embodiment of the image pickup lens and the image pickup apparatus according to the present invention, specifically the configuration of an image pickup lens according to a first exemplary embodiment of the present invention.

Embodiments of the image pickup lens and the image pickup apparatus according to the present invention will now be described.

A general embodiment of the image pickup lens according to the present invention will first be described.

An image pickup lens according to the general embodiment includes, in order from an object side to an image side, an aperture stop, a first lens element having a positive refractive power, a second lens element having a negative refractive power, a third lens element having a positive refractive power, and a fourth lens element having a negative refractive power. The second lens element has a biconcave shape. The third lens element has a meniscus shape whose concave surface faces the object side.

The second lens element having a biconcave shape causes off-axis rays, which may produce ghosts when totally reflected, to diffuse toward the outer periphery of the image pickup lens and thus prevents such rays from being incident on a solid-state image pickup device, such as a CCD or a CMOS. This is advantageous in correction of coma.

The third lens element having a positive refractive power and a meniscus shape is advantageous in correction of aberrations, specifically, field curvature and astigmatism. The third lens element also causes off-axis rays, which may produce ghosts when totally reflected, to diffuse toward the outer periphery of the image pickup lens and thus prevents such rays from being incident on a solid-state image pickup device, such as a CCD or a CMOS. Accordingly, deterioration of image quality is prevented.

The image pickup lens according to the general embodiment satisfies the following conditional expressions:

$$0.20 < f/|f2| < 0.9 \quad (1)$$

$$vd1 - vd2 > 25 \quad (2)$$

where f denotes the focal length of the entire lens system, f2 denotes the focal length of the second lens element, vd1 denotes the Abbe number of the first lens element, and vd2 denotes the Abbe number of the second lens element.

Conditional Expression (1) defines an appropriate refractive power to be allocated to the second lens element relative to the refractive power of the entire lens system. The focal length of the second lens element is represented as an absolute value because the second lens element has a negative refractive power.

If the upper limit of Conditional Expression (1) is exceeded, the refractive power of the second lens element becomes too strong, making it difficult to correct off-axis aberrations, specifically, astigmatism and field curvature. This may also deteriorate ease of assembly in the manufacturing process.

If the lower limit of Conditional Expression (1) is exceeded, the refractive power of the second lens element becomes too weak, making it difficult to reduce the total length of the image pickup lens and thus preventing size reduction.

That is, with the image pickup lens satisfying Conditional Expression (1), off-axis aberrations can be corrected well. Accordingly, ease of assembly in the manufacturing process is improved. Moreover, even in the configuration including four lens elements, the total length of the image pickup lens can be reduced, leading to size reduction.

Conditional Expression (2) defines the Abbe numbers of the first and second lens elements for d-line.

If the first and second lens elements are made of materials (glass) having the Abbe numbers satisfying Conditional Expression (2), chromatic aberration can be corrected well without markedly increasing the refractive powers of the first and second lens elements. Since the refractive powers of the first and second lens elements are not very strong, marginal coma and field curvature are suppressed.

An image pickup lens according to an embodiment of the present invention preferably satisfies the following conditional expression:

$$0.2 < f/|f2| < 0.7 \quad (3)$$

where f1 denotes the focal length of the first lens element.

Conditional Expression (3) defines appropriate refractive powers to be allocated to the first and second lens elements, respectively. The focal length of the second lens element is represented as an absolute value because the second lens element has a negative refractive power.

If the upper limit of Conditional Expression (3) is exceeded, the refractive powers of the first and second lens elements become too strong. This opposes the aforementioned advantageous effect of correcting chromatic aberration without markedly increasing the refractive powers of the first and second lens elements. As described above, marginal coma and field curvature can be suppressed because the refractive powers of the first and second lens elements are not very strong. Therefore, within the upper limit of Conditional Expression (3), the image pickup lens can maintain good optical performance.

If the lower limit of Conditional Expression (3) is exceeded, the balance of refractive power between the first lens element and the second lens element is disturbed. Specifically, the refractive power of the second lens element becomes too weak relative to the refractive power of the first lens element. Consequently, it becomes very difficult to correct chromatic aberration well.

That is, with the image pickup lens satisfying Conditional Expression (3), good aberration correctability can be realized, and, in conjunction with the refractive power of the second lens element defined by Conditional Expression (1), manufacturing sensitivity can be reduced. By satisfying Conditional Expression (3), the image pickup lens can maintain good optical performance, and chromatic aberration can be corrected well.

In an image pickup lens according to another embodiment of the present invention, the aperture stop is preferably positioned near the image side with respect to the apex of the object-side surface of the first lens element.

With the aperture stop being positioned near the image side with respect to the apex of the object-side surface of the first lens element, the amount of light to be incident on the first lens element can be increased, compared to a case where the aperture stop is positioned near the object side with respect to the apex of the object-side surface of the first lens element.

Moreover, with the aperture stop being positioned near the image side with respect to the apex of the object-side surface of the first lens element, the total optical length can be reduced, leading to size reduction.

In an image pickup lens according to another embodiment of the present invention, both surfaces of the first lens element, both surfaces of the second lens element, both surfaces of the third lens element, and both surfaces of the fourth lens element are preferably aspherical.

With the first, second, third, and fourth lens elements each having both surfaces thereof being aspherical, aberrations occurring in the respective lens elements can be corrected well. Accordingly, optical performance is improved.

Next, exemplary embodiments of the image pickup lens according to the present invention and numerical examples provided by applying specific values to the exemplary embodiments will be described with reference to the drawings and tables.

Reference characters used in the description and tables provided hereinafter denote as follows.

"Si" denotes the surface number of the i-th surface counted from the object side to the image side, "Ri" denotes the curvature radius of the i-th surface, "Di" denotes the axial surface interval between the i-th surface and the (i+1)-th surface, "Ndi" denotes the refractive index of the material composing the i-th lens element with respect to d-line (having a wavelength of 587.6 nm), and "vdi" denotes the Abbe number of the material composing the i-th lens element with respect to d-line. "STO" added to the surface number indicates that the surface of interest is the field stop.

Some of lens elements used in the numerical examples have aspherical surfaces. For each of the aspherical surfaces, when "Z" denotes the depth of the aspherical surface; "Y" denotes the height in the vertical direction with respect to the optical axis; "R" denotes the curvature radius; "K" denotes the conic constant; and "A", "B", "C", "D", "E", "F", and "G" denote the aspherical coefficients of the fourth, sixth, eighth, tenth, twelfth, fourteenth, and sixteenth orders, respectively, the aspherical shape is defined as follows:

$$Z = \frac{Y^2/R}{1+\sqrt{1-(1+K)(Y/R)^2}} + AY^4 + BY^6 + \ldots + GY^{16}$$

FIG. 1 shows the configuration of an image pickup lens 1 according to a first exemplary embodiment of the present invention.

As can be seen from FIG. 1, the image pickup lens 1 of the first exemplary embodiment includes four lens elements.

The image pickup lens 1 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 1 below summarizes lens data of Numerical Example 1 provided by applying specific values to the image pickup lens 1 according to the first exemplary embodiment, together with the F-number FNo, the focal length f of the entire lens system, the focal length f1 of the first lens element G1, the focal length f2 of the second lens element G2, and the diagonal total angle of view 2ω.

TABLE 1

FNo = 2.8
f = 5.5
f1 = 4.233
f2 = −6.513
2ω = 66.7°
Numerical Example 1

| Si Surface number | Ri Curvature radius | Di Interval | Ndi Refractive index | vdi Abbe number |
|---|---|---|---|---|
| 1 (STO) | ∞ | 0.030 | | |
| 2 | 2.893 | 1.054 | 1.530 | 55.8 |
| 3 | −8.897 | 0.300 | | |
| 4 | −9.082 | 0.500 | 1.583 | 29.0 |
| 5 | 6.751 | 0.900 | | |
| 6 | −4.509 | 1.017 | 1.530 | 55.8 |
| 7 | −1.406 | 0.250 | | |

TABLE 1-continued

FNo = 2.8
f = 5.5
f1 = 4.233
f2 = −6.513
2ω = 66.7°
Numerical Example 1

| Si Surface number | Ri Curvature radius | Di Interval | Ndi Refractive index | vdi Abbe number |
|---|---|---|---|---|
| 8 | 9.273 | 0.850 | 1.530 | 55.8 |
| 9 | 1.579 | 1.015 | | |
| 10 | ∞ | 0.145 | 1.518 | 64.1 |
| 11 | ∞ | 0.939 | | |

In the image pickup lens 1, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 1 are shown in Table 2.

In Table 2, and other tables provided separately below, showing the aspherical coefficients and the like, "E-i" is an exponential expression with a radix number of 10, i.e., "$10^{-i}$". For example, "0.12345E−05" represents "$0.12345 \times 10^{-5}$".

TABLE 2

Numerical Example 1

| Si Surface number | K Conic constant | A 4th | B 6th | C 8th |
|---|---|---|---|---|
| 1 (STO) | | | | |
| 2 | −1.115E+01 | 5.084E−02 | −3.493E−02 | 1.626E−02 |
| 3 | 9.485E+00 | −3.076E−02 | −1.496E−02 | 4.521E−03 |
| 4 | 0.000E+00 | −5.784E−02 | −1.727E−02 | 1.052E−02 |
| 5 | 1.361E+00 | −1.933E−02 | −5.195E−03 | 3.592E−03 |
| 6 | 1.397E+00 | 7.192E−03 | 4.593E−03 | −6.218E−03 |
| 7 | −4.117E+00 | −6.454E−02 | 3.482E−02 | −1.325E−02 |
| 8 | 0.000E+00 | −5.350E−02 | 1.530E−02 | −3.063E−03 |
| 9 | −6.450E+00 | −3.083E−02 | 5.681E−03 | −8.011E−04 |

| Si Surface number | D 10th | E 12th | F 14th | G 16th |
|---|---|---|---|---|
| 1 (STO) | | | | |
| 2 | −7.460E−03 | | | |
| 3 | −2.294E−03 | | | |
| 4 | −8.277E−05 | | | |
| 5 | −1.525E−04 | | | |
| 6 | 1.373E−03 | | | |
| 7 | 5.179E−03 | −2.041E−03 | 5.380E−04 | −5.444E−05 |
| 8 | 3.718E−04 | −1.850E−05 | | |
| 9 | 5.910E−05 | −1.790E−06 | | |

Figure 2:
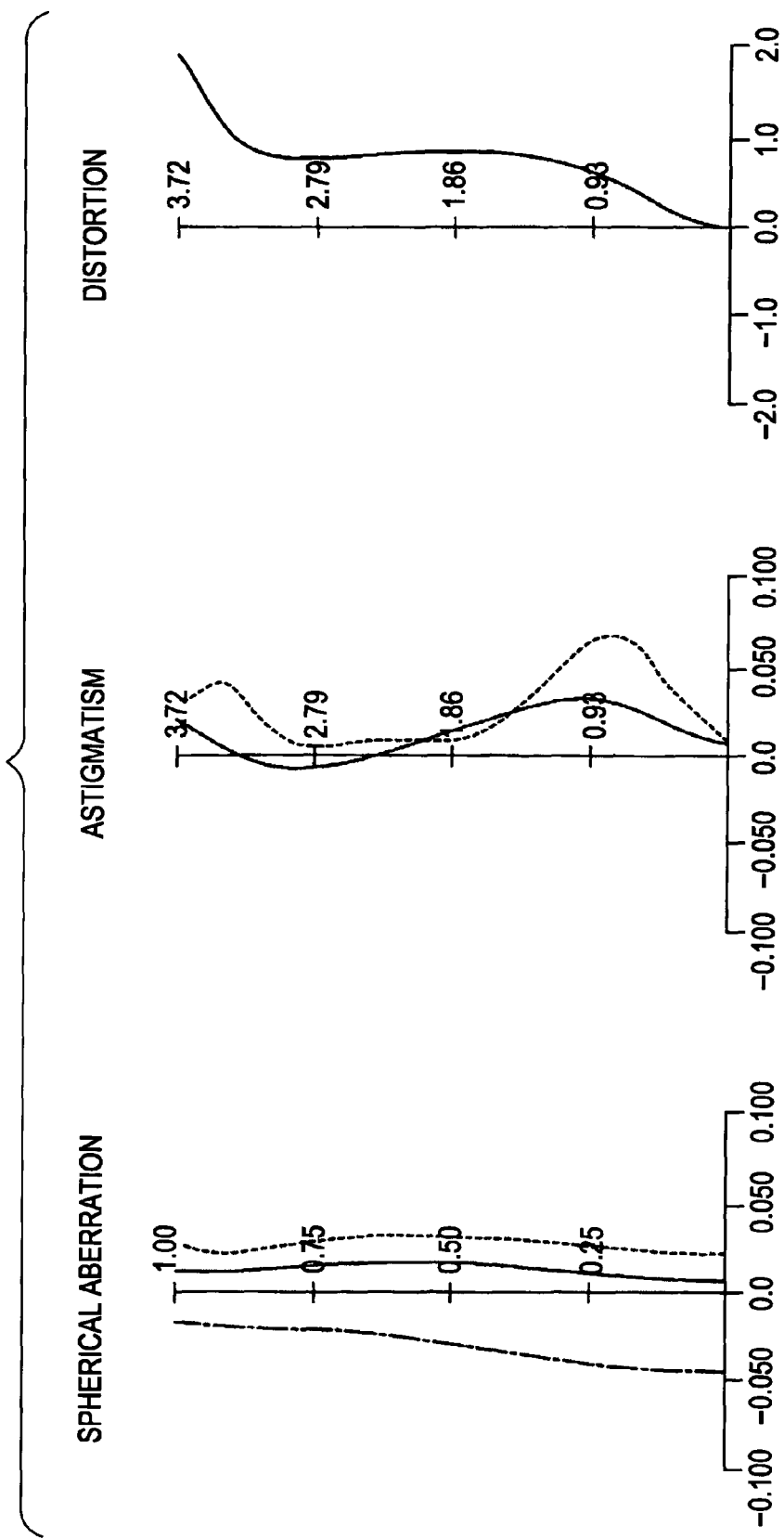
FIG. 2 includes diagrams showing spherical aberration, astigmatism, and distortion in a numerical example provided by applying specific values to the first exemplary embodiment.

FIG. 2 shows diagrams of aberrations occurring in Numerical Example 1.

In the diagram of spherical aberration shown in FIG. 2, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 2, the solid line represents values in the sagittal image plane, and the dashed line represents values in the meridional image plane.

As is apparent from the diagrams in FIG. 2, Numerical Example 1 exhibits good correctability for various aberrations and excellent imaging performance.

Figure 3:
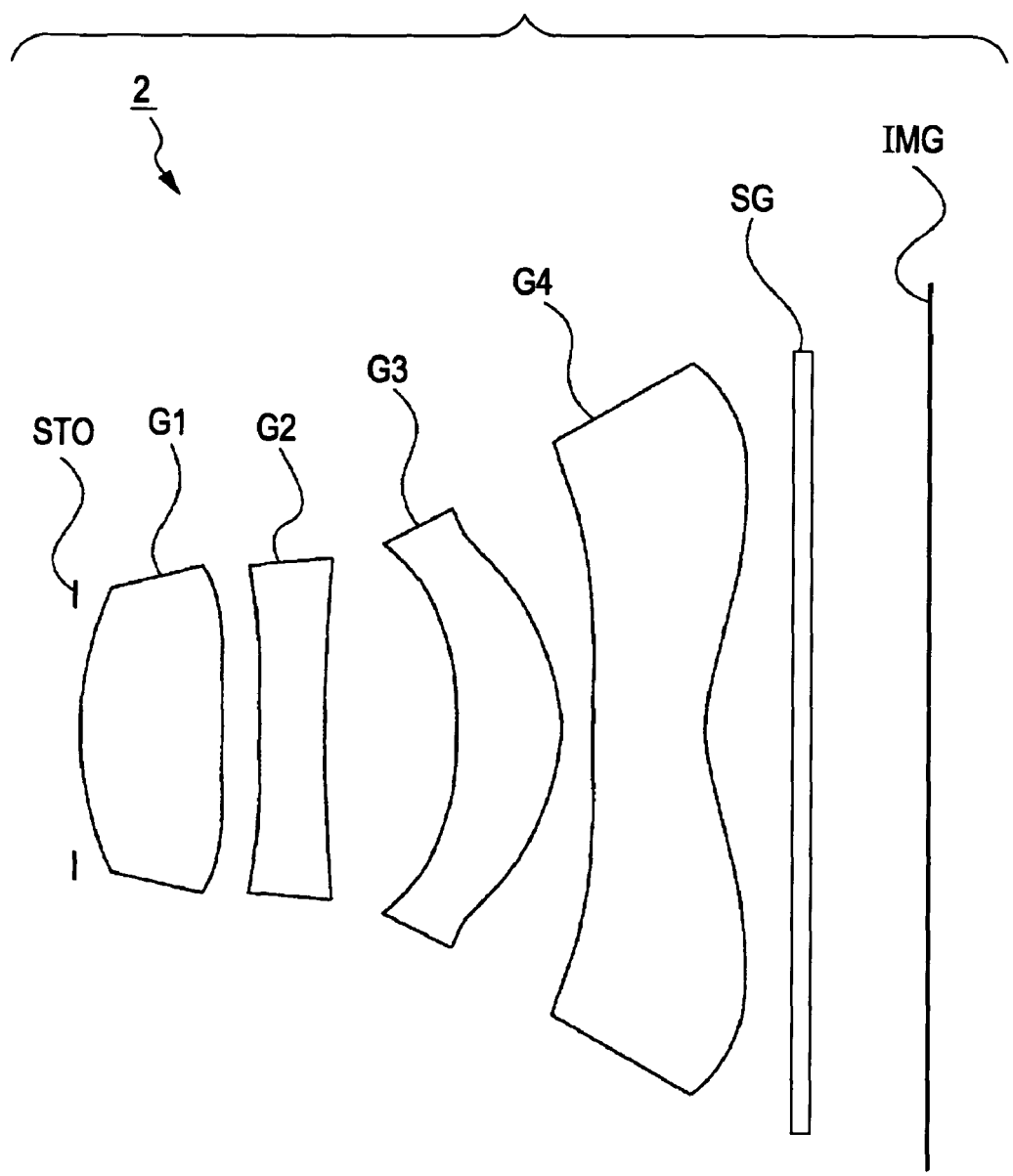
FIG. 3 shows the configuration of an image pickup lens according to a second exemplary embodiment of the present invention.

FIG. 3 shows the configuration of an image pickup lens 2 according to a second exemplary embodiment of the present invention.

As can be seen from FIG. 3, the image pickup lens 2 of the second exemplary embodiment includes four lens elements.

The image pickup lens 2 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 3 below summarizes lens data of Numerical Example 2 provided by applying specific values to the image pickup lens 21 according to the second exemplary embodiment, together with the F-number FNo, the focal length f of the entire lens system, the focal length f1 of the first lens element G1, the focal length f2 of the second lens element G2, and the diagonal total angle of view 2ω.

TABLE 3

FNo = 2.8
f = 5.8
f1 = 5.183
f2 = −21.664
2ω = 64.4°
Numerical Example 2

| Si Surface number | Ri Curvature radius | Di Interval | Ndi Refractive index | vdi Abbe number |
|---|---|---|---|---|
| 1 (STO) | ∞ | 0.030 | | |
| 2 | 2.904 | 1.168 | 1.553 | 71.7 |
| 3 | −273.838 | 0.324 | | |
| 4 | −349.980 | 0.518 | 1.632 | 23.0 |
| 5 | 14.409 | 1.101 | | |
| 6 | −2.861 | 0.844 | 1.530 | 55.8 |
| 7 | −1.499 | 0.250 | | |
| 8 | 9.762 | 0.930 | 1.530 | 55.8 |
| 9 | 1.671 | 0.750 | | |
| 10 | ∞ | 0.145 | 1.518 | 64.1 |
| 11 | ∞ | 0.939 | | |

In the image pickup lens 2, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 2 are shown in Table 4.

TABLE 4

Numerical Example 2

| Si Surface number | K Conic constant | A 4th | B 6th | C 8th |
|---|---|---|---|---|
| 1 (STO) | | | | |
| 2 | −1.115E+01 | 4.808E−02 | −2.957E−02 | 1.175E−02 |
| 3 | 9.485E+00 | −4.037E−02 | −6.230E−03 | 4.211E−03 |
| 4 | 0.000E+00 | −4.113E−02 | −7.047E−03 | 1.233E−02 |
| 5 | 1.361E+00 | −1.168E−02 | −1.223E−03 | 4.242E−03 |
| 6 | 1.397E+00 | 4.419E−03 | 2.502E−03 | −7.372E−03 |
| 7 | −4.117E+00 | −6.233E−02 | 3.000E−02 | −1.319E−02 |
| 8 | 0.000E+00 | −5.497E−02 | 1.566E−02 | −3.127E−03 |
| 9 | −6.450E+00 | −2.784E−02 | 5.474E−03 | −7.959E−04 |

| Si Surface number | D 10th | E 12th | F 14th | G 16th |
|---|---|---|---|---|
| 1 (STO) | | | | |
| 2 | −3.441E−03 | | | |
| 3 | −1.158E−03 | | | |
| 4 | −2.143E−03 | | | |
| 5 | −5.824E−04 | | | |
| 6 | 1.744E−03 | | | |
| 7 | 5.135E−03 | −2.010E−03 | 5.392E−04 | −5.458E−05 |
| 8 | 3.651E−04 | −1.798E−05 | | |
| 9 | 5.990E−05 | −1.988E−06 | | |

Figure 4:
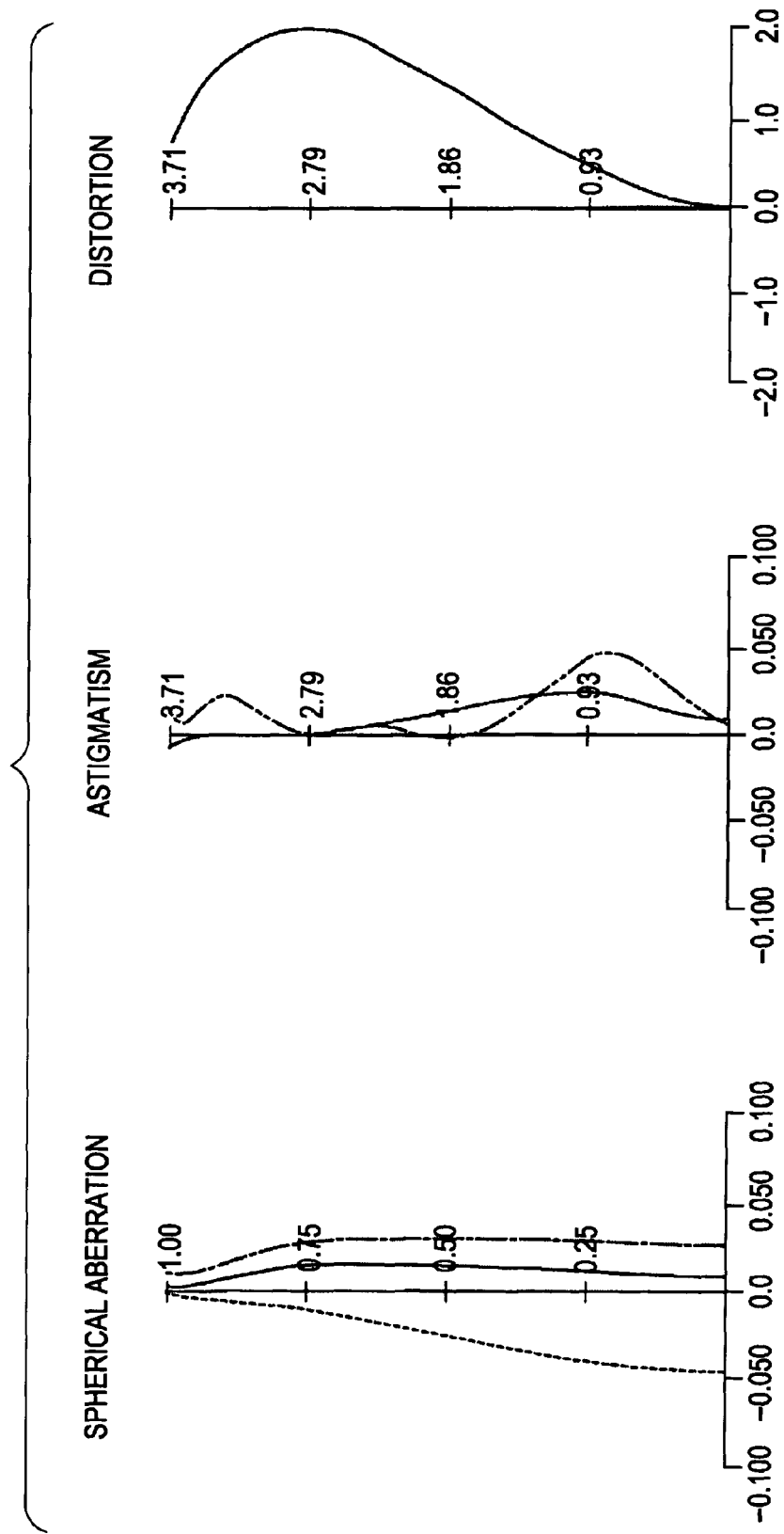
FIG. 4 includes diagrams showing spherical aberration, astigmatism, and distortion in a numerical example provided by applying specific values to the second exemplary embodiment.

FIG. 4 shows diagrams of aberrations occurring in Numerical Example 2.

In the diagram of spherical aberration shown in FIG. 4, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 4, the solid line represents values in the sagittal image plane, and the dashed line represents values in the meridional image plane.

As is apparent from the diagrams in FIG. 4, Numerical Example 2 exhibits good correctability for various aberrations and excellent imaging performance.

Figure 5:
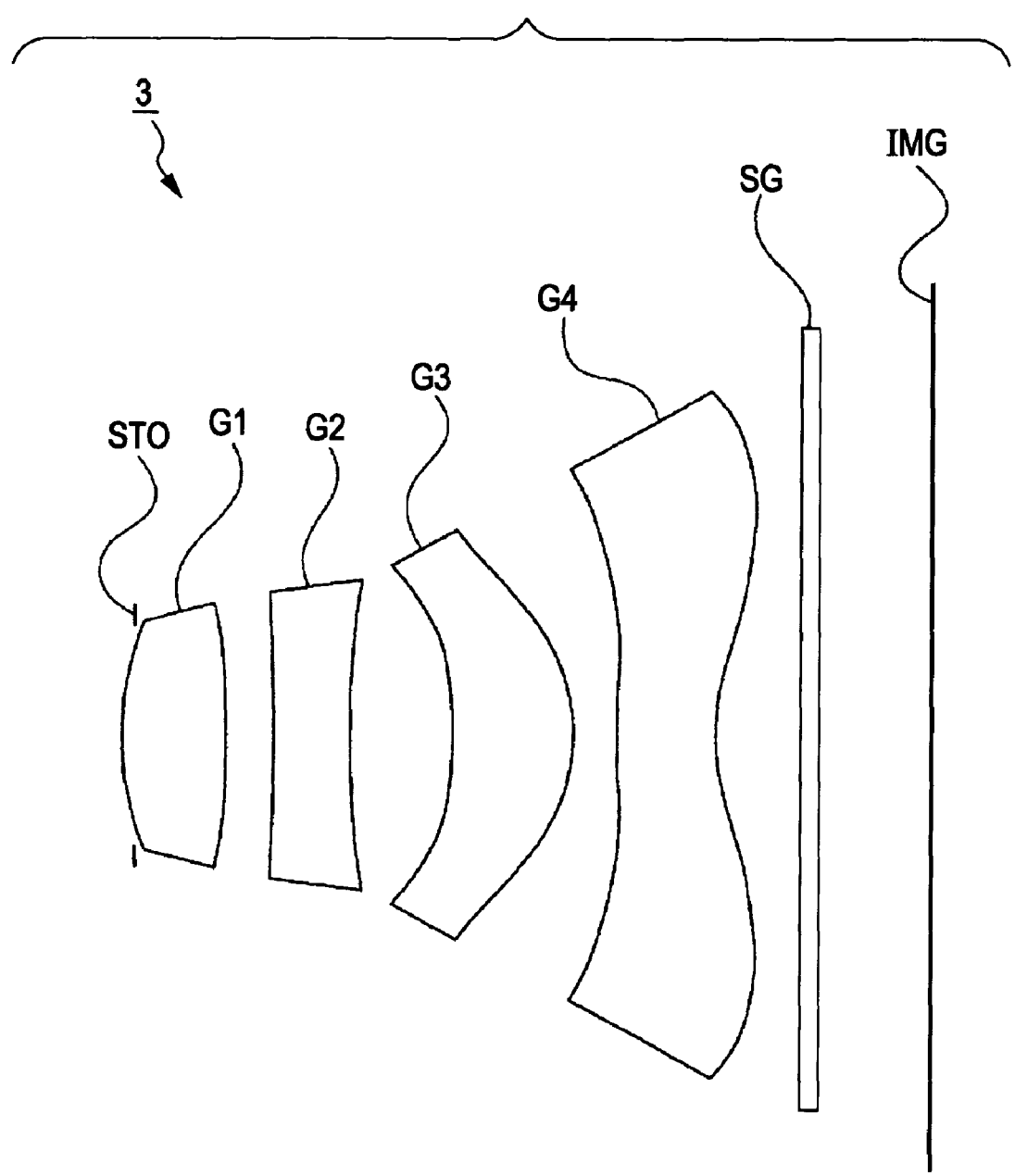
FIG. 5 shows the configuration of an image pickup lens according to a third exemplary embodiment of the present invention.

FIG. 5 shows the configuration of an image pickup lens 3 according to a third exemplary embodiment of the present invention.

As can be seen from FIG. 5, the image pickup lens 3 of the third exemplary embodiment includes four lens elements.

The image pickup lens 3 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

In the image pickup lens 3, the aperture stop STO is positioned near the image side with respect to the apex of the object-side surface of the first lens element G1.

Table 5 below summarizes lens data of Numerical Example 3 provided by applying specific values to the image pickup lens 3 according to the third exemplary embodiment, together with the F-number FNo, the focal length f of the entire lens system, the focal length f1 of the first lens element G1, the focal length f2 of the second lens element G2, and the diagonal total angle of view 2ω.

TABLE 5

FNo = 2.8
f = 5.6
f1 = 4.990
f2 = −13.963
2ω = 66.3°
Numerical Example 3

| Si Surface number | Ri Curvature radius | Di Interval | Ndi Refractive index | vdi Abbe number |
|---|---|---|---|---|
| 1 (STO) | ∞ | −0.100 | | |
| 2 | 3.028 | 0.908 | 1.530 | 55.8 |
| 3 | −19.343 | 0.408 | | |
| 4 | −105.349 | 0.653 | 1.649 | 15.0 |
| 5 | 10.109 | 0.900 | | |
| 6 | −3.428 | 1.067 | 1.530 | 55.8 |
| 7 | −1.424 | 0.350 | | |
| 8 | 13.691 | 0.850 | 1.530 | 55.8 |
| 9 | 1.594 | 0.750 | | |
| 10 | ∞ | 0.145 | 1.518 | 64.1 |
| 11 | ∞ | 0.939 | | |

In the image pickup lens 3, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 3 are shown in Table 6.

TABLE 6

Numerical Example 3

| Si Surface number | K Conic constant | A 4th | B 6th | C 8th |
|---|---|---|---|---|
| 1 (STO) | | | | |
| 2 | −1.115E+01 | 3.971E−02 | −2.532E−02 | 8.104E−03 |
| 3 | 9.485E+00 | −2.456E−02 | −6.203E−03 | 4.220E−03 |
| 4 | 0.000E+00 | −1.670E−02 | −4.256E−03 | 9.533E−03 |
| 5 | 1.361E+00 | −3.411E−03 | −1.758E−03 | 2.888E−03 |
| 6 | 1.397E+00 | −9.966E−03 | −5.801E−04 | −8.434E−03 |
| 7 | −4.117E+00 | −7.337E−02 | 2.958E−02 | −1.299E−02 |
| 8 | 0.000E+00 | −5.366E−02 | 1.560E−02 | −3.106E−03 |
| 9 | −6.450E+00 | −2.777E−02 | 5.456E−03 | −7.957E−04 |

| Si Surface number | D 10th | E 12th | F 14th | G 16th |
|---|---|---|---|---|
| 1 (STO) | | | | |
| 2 | −2.511E−03 | | | |
| 3 | −1.718E−03 | | | |
| 4 | −1.960E−03 | | | |
| 5 | −3.009E−05 | | | |
| 6 | 2.820E−03 | | | |
| 7 | 5.094E−03 | −2.024E−03 | 5.527E−04 | −5.686E−05 |
| 8 | 3.671E−04 | −2.013E−05 | | |
| 9 | 5.992E−05 | −1.974E−06 | | |

Figure 6:
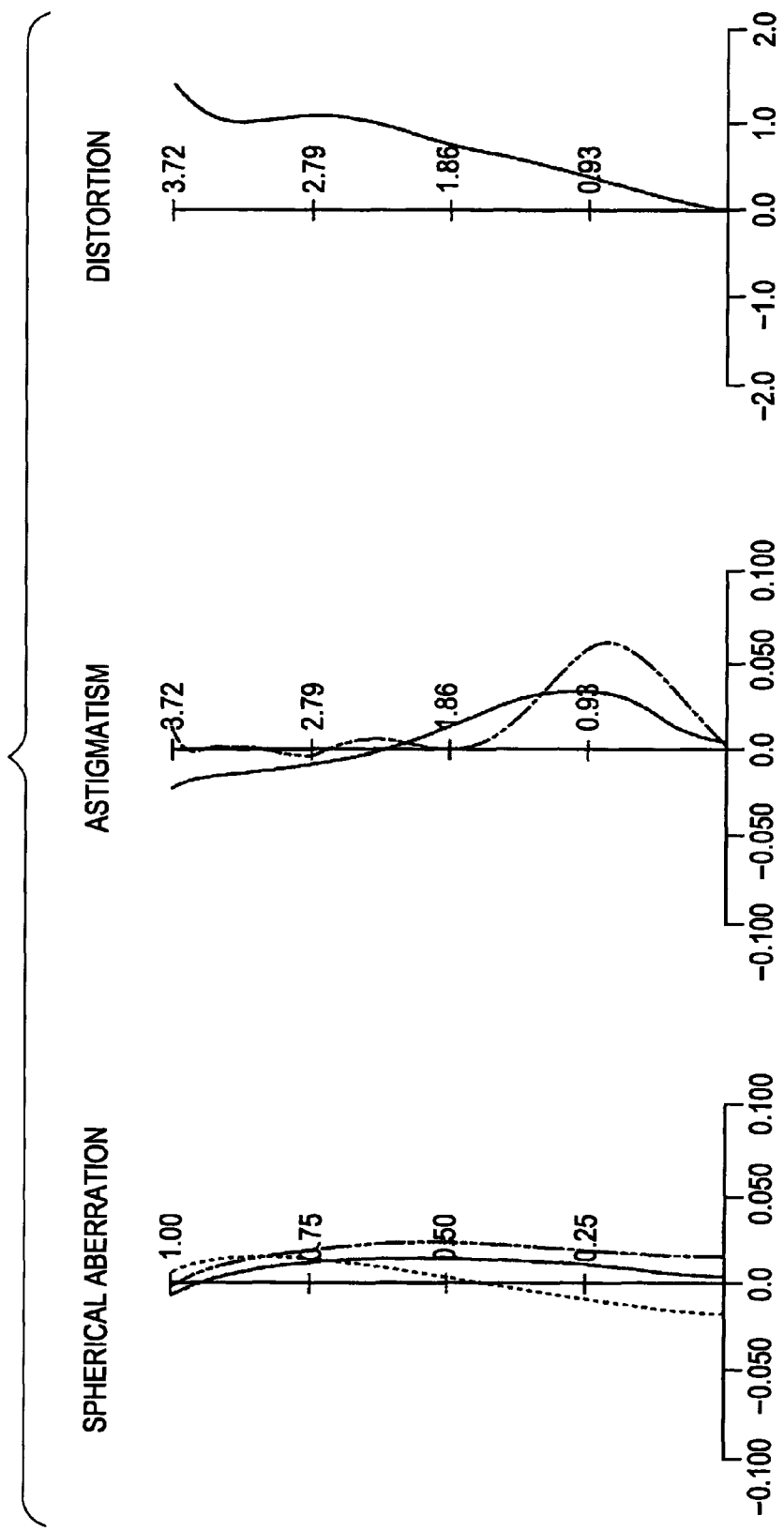
FIG. 6 includes diagrams showing spherical aberration, astigmatism, and distortion in a numerical example provided by applying specific values to the third exemplary embodiment.

FIG. 6 shows diagrams of aberrations occurring in Numerical Example 3.

In the diagram of spherical aberration shown in FIG. 6, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 6, the solid line represents values in the sagittal image plane, and the dashed line represents values in the meridional image plane.

As is apparent from the diagrams in FIG. 6, Numerical Example 3 exhibits good correctability for various aberrations and excellent imaging performance.

Figure 7:
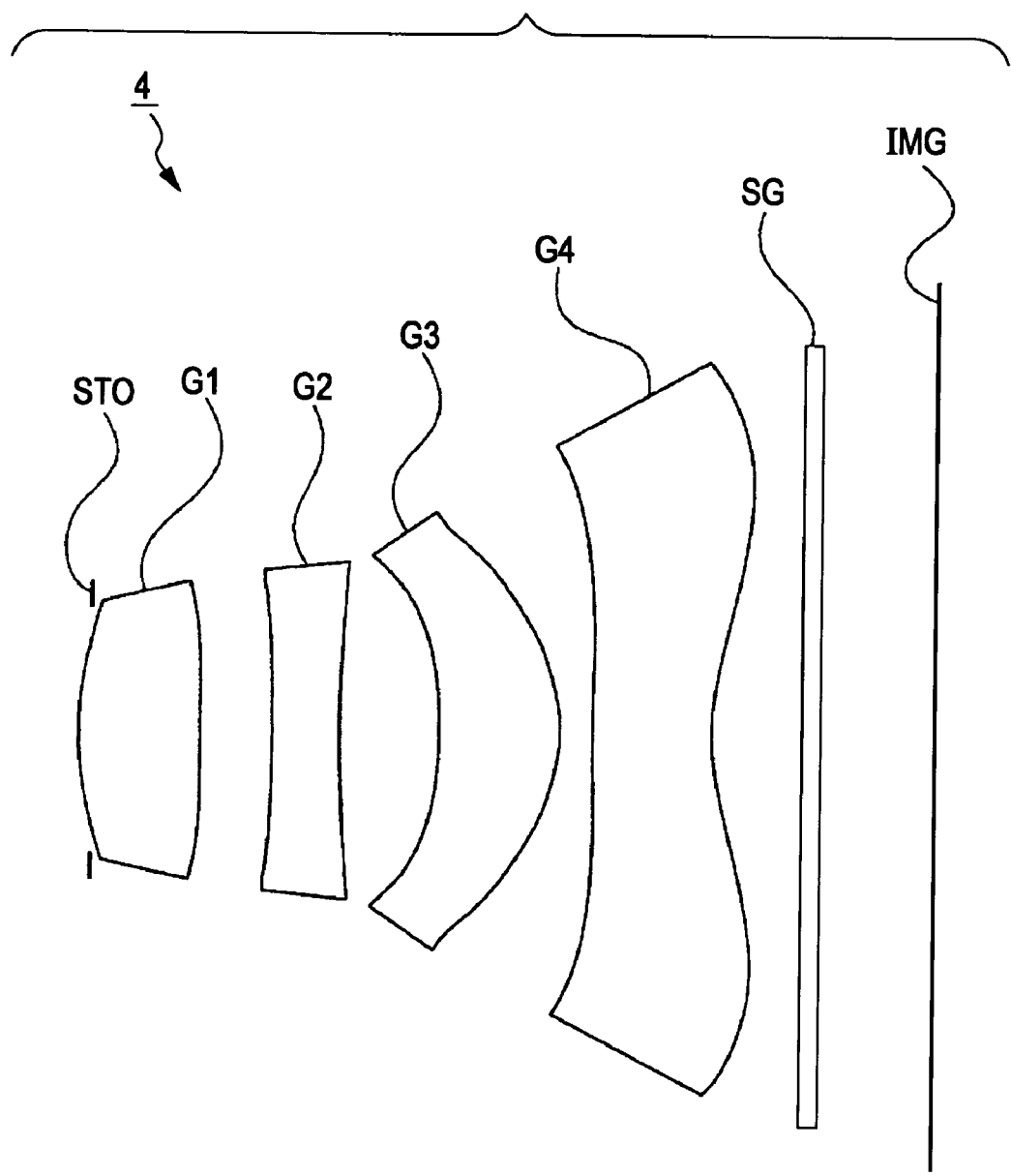
FIG. 7 shows the configuration of an image pickup lens according to a fourth exemplary embodiment of the present invention.

FIG. 7 shows the configuration of an image pickup lens 4 according to a fourth exemplary embodiment of the present invention.

As can be seen from FIG. 7, the image pickup lens 4 of the fourth exemplary embodiment includes four lens elements.

The image pickup lens 4 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG. In the image pickup lens 4, the aperture stop STO is positioned near the image side with respect to the apex of the object-side surface of the first lens element G1. Table 7 below summarizes lens data of Numerical Example provided by applying specific values to the image pickup lens 4 according to the fourth exemplary embodiment, together with the F-number FNo, the focal length f of the entire lens system, the focal length f1 of the first lens element G1, the focal length f2 of the second lens element G2, and the diagonal total angle of view 2ω.

TABLE 7

FNo = 2.8
f = 5.8
f1 = 5.012
f2 = −15.179
2ω = 64.4°
Numerical Example 4

| Si Surface number | Ri Curvature radius | Di Interval | Ndi Refractive index | vdi Abbe number |
|---|---|---|---|---|
| 1 (STO) | ∞ | −0.100 | | |
| 2 | 2.949 | 0.995 | 1.553 | 95.0 |
| 3 | −42.782 | 0.582 | | |
| 4 | −126.765 | 0.572 | 1.632 | 23.0 |
| 5 | 10.512 | 0.817 | | |
| 6 | −3.013 | 0.963 | 1.530 | 55.8 |
| 7 | −1.506 | 0.250 | | |
| 8 | 9.478 | 0.958 | 1.530 | 55.8 |
| 9 | 1.702 | 0.750 | | |
| 10 | ∞ | 0.145 | 1.518 | 64.1 |
| 11 | ∞ | 0.939 | | |

In the image pickup lens 4, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 4 are shown in Table 8.

TABLE 8

Numerical Example 4

| Si Surface number | K Conic constant | A 4th | B 6th | C 8th |
|---|---|---|---|---|
| 1 (STO) | | | | |
| 2 | −1.115E+01 | 4.351E−02 | −2.963E−02 | 1.164E−02 |
| 3 | 9.485E+00 | −2.894E−02 | −6.272E−03 | 3.140E−03 |
| 4 | 0.000E+00 | −3.157E−02 | −5.439E−03 | 1.219E−02 |
| 5 | 1.361E+00 | −1.599E−02 | −1.576E−03 | 3.650E−03 |
| 6 | 1.397E+00 | −4.704E−03 | −2.045E−03 | −9.241E−03 |
| 7 | −4.117E+00 | −6.836E−02 | 2.945E−03 | −1.337E−02 |
| 8 | 0.000E+00 | −5.405E−02 | 1.579E−02 | −3.128E−03 |
| 9 | −6.450E+00 | −2.797E−02 | 5.481E−03 | −7.930E−04 |

| Si Surface number | D 10th | E 12th | F 14th | G 16th |
|---|---|---|---|---|
| 1 (STO) | | | | |
| 2 | −3.751E−03 | | | |
| 3 | −1.401E−03 | | | |
| 4 | −2.262E−03 | | | |
| 5 | 3.047E−05 | | | |
| 6 | 1.753E−03 | | | |
| 7 | 5.047E−03 | −2.016E−03 | 5.435E−04 | −5.375E−05 |
| 8 | 3.622E−04 | −1.864E−05 | | |
| 9 | 6.016E−05 | −1.993E−06 | | |

Figure 8:
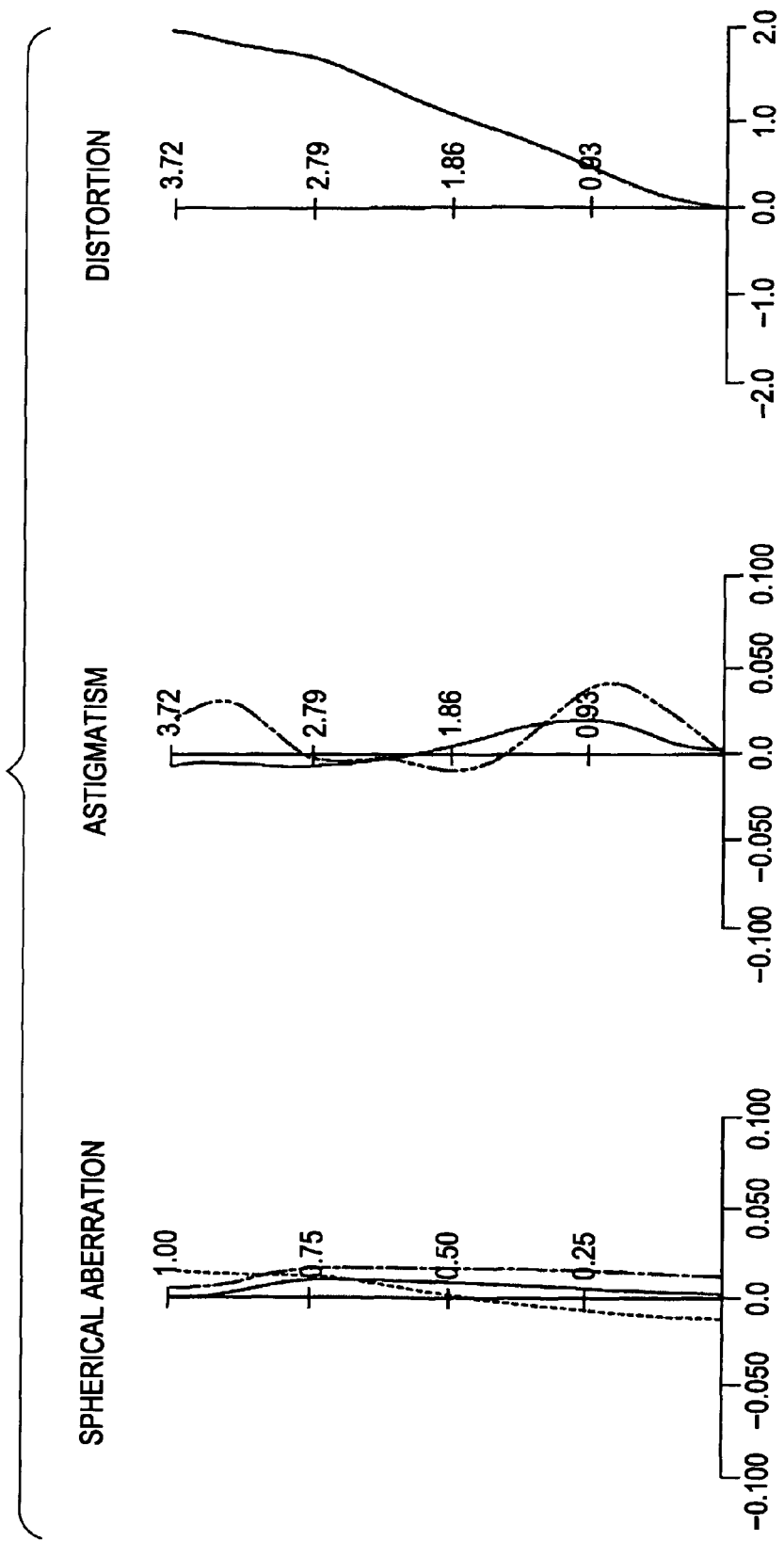
FIG. 8 includes diagrams showing spherical aberration, astigmatism, and distortion in a numerical example provided by applying specific values to the fourth exemplary embodiment.

FIG. 8 shows diagrams of aberrations occurring in Numerical Example 4.

In the diagram of spherical aberration shown in FIG. 8, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 8, the solid line represents values in the sagittal image plane, and the dashed line represents values in the meridional image plane.

As is apparent from the diagrams in FIG. 8, Numerical Example 4 exhibits good correctability for various aberrations and excellent imaging performance.

Figure 9:
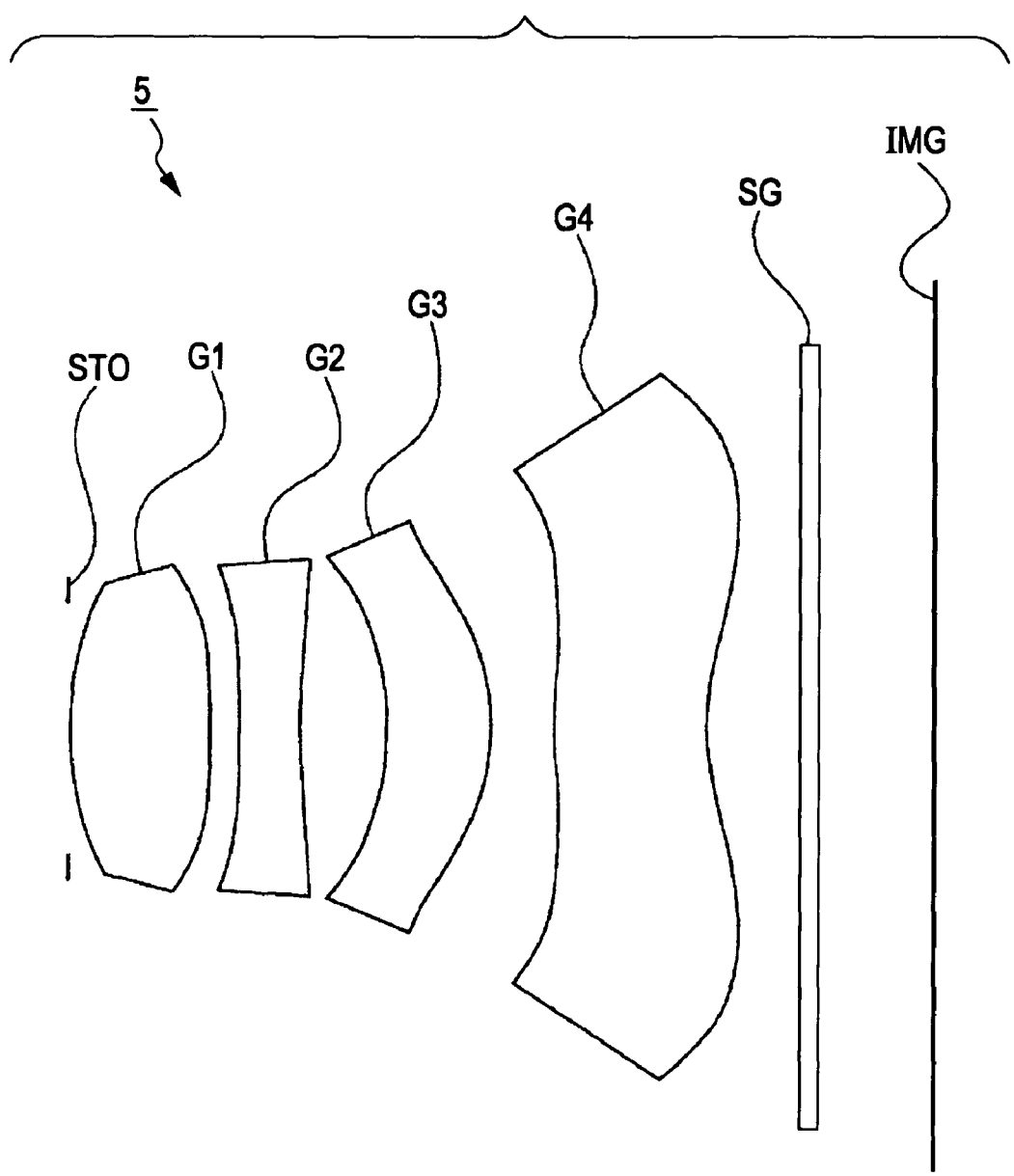
FIG. 9 shows the configuration of an image pickup lens according to a fifth exemplary embodiment of the present invention.

FIG. 9 shows the configuration of an image pickup lens 5 according to a fifth exemplary embodiment of the present invention.

As can be seen from FIG. 9, the image pickup lens 5 of the fifth exemplary embodiment includes four lens elements.

The image pickup lens 5 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 9 below summarizes lens data of Numerical Example 5 provided by applying specific values to the image pickup lens 5 according to the fifth exemplary embodiment, together with the F-number FNo, the focal length f of the entire lens system, the focal length f1 of the first lens element G1, the focal length f2 of the second lens element G2, and the diagonal total angle of view 2ω.

TABLE 9

FNo = 2.8
f = 5.8
f1 = 4.169
f2 = −9.182
2ω = 64.2°

Numerical Example 5

| Si Surface number | Ri Curvature radius | Di Interval | Ndi Refractive index | νdi Abbe number |
|---|---|---|---|---|
| 1 (STO) | ∞ | 0.030 | | |
| 2 | 2.641 | 1.111 | 1.530 | 55.8 |
| 3 | −11.864 | 0.250 | | |
| 4 | −31.619 | 0.500 | 1.623 | 23.0 |
| 5 | 7.115 | 0.700 | | |
| 6 | −2.378 | 0.840 | 1.530 | 55.8 |
| 7 | −1.829 | 0.504 | | |
| 8 | 6.005 | 1.230 | 1.530 | 55.8 |
| 9 | 2.336 | 0.750 | | |
| 10 | ∞ | 0.145 | 1.518 | 64.1 |
| 11 | ∞ | 0.939 | | |

In the image pickup lens 5, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 5 are shown in Table 10.

TABLE 10

Numerical Example 5

| Si Surface number | K Conic constant | A 4th | B 6th | C 8th |
|---|---|---|---|---|
| 1 (STO) | | | | |
| 2 | −1.115E+01 | 6.715E−02 | −4.445E−02 | 1.981E−02 |
| 3 | 9.485E+00 | −4.544E−02 | −1.111E−02 | 4.304E−03 |
| 4 | 0.000E+00 | −5.724E−02 | −1.441E−02 | 1.170E−02 |
| 5 | 1.361E+00 | −1.660E−02 | −9.212E−03 | 6.132E−03 |
| 6 | 1.397E+00 | 1.981E−02 | −2.476E−03 | −8.743E−05 |
| 7 | −4.117E+00 | −7.716E−02 | 3.229E−02 | −1.075E−02 |
| 8 | 0.000E+00 | −7.349E−02 | 1.847E−02 | −3.280E−03 |
| 9 | −6.450E+00 | −3.215E−02 | 5.523E−03 | −8.018E−04 |

| Si Surface number | D 10th | E 12th | F 14th | G 16th |
|---|---|---|---|---|
| 1 (STO) | | | | |
| 2 | −7.019E−03 | | | |
| 3 | −1.245E−03 | | | |
| 4 | 2.138E−04 | | | |
| 5 | −1.136E−03 | | | |
| 6 | 1.417E−03 | | | |
| 7 | 4.690E−03 | −1.889E−03 | 6.328E−04 | −8.553E−05 |
| 8 | 3.161E−04 | −2.716E−05 | | |
| 9 | 5.883E−05 | −1.982E−06 | | |

Figure 10:
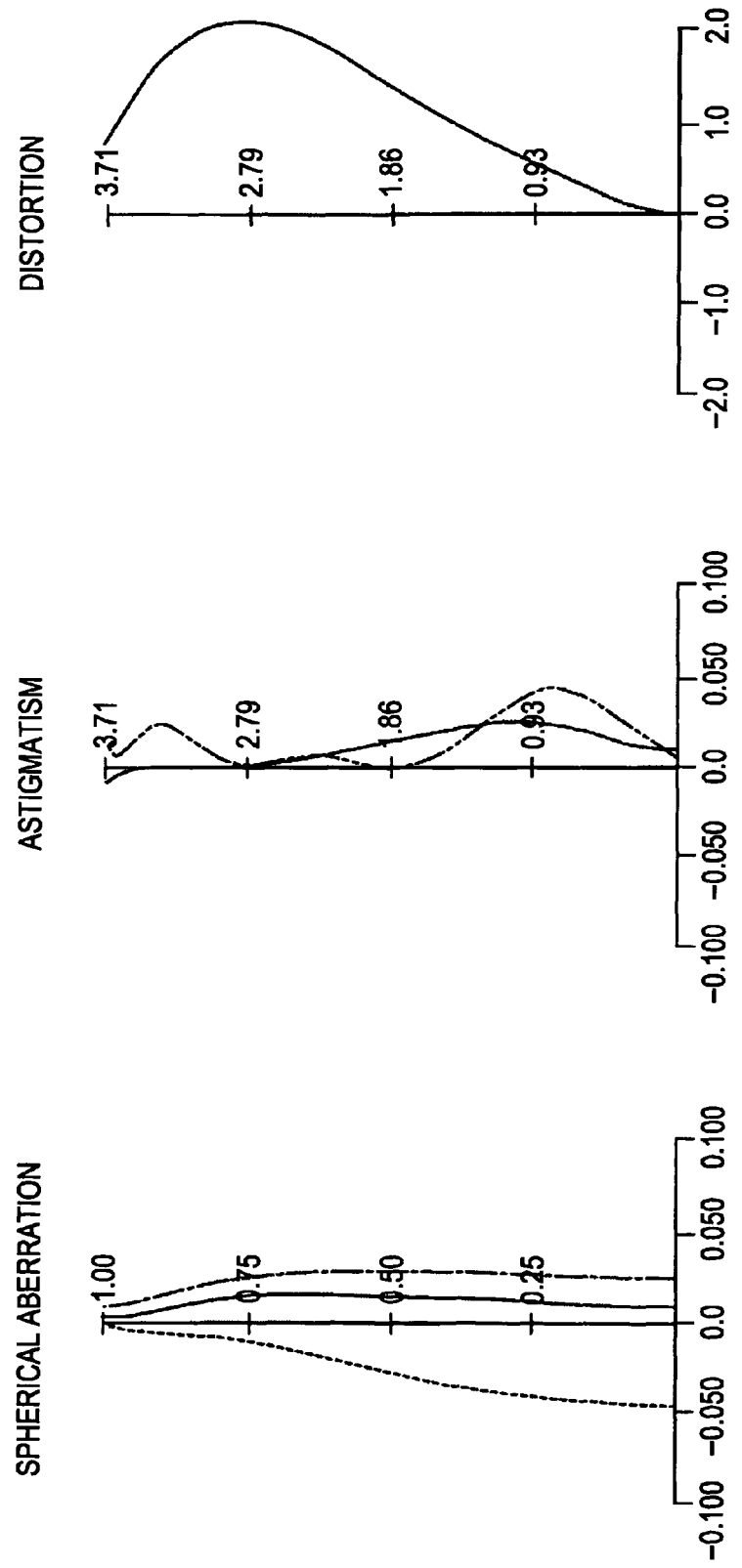
FIG. 10 includes diagrams showing spherical aberration, astigmatism, and distortion in a numerical example provided by applying specific values to the fifth exemplary embodiment.

FIG. 10 shows diagrams of aberrations occurring in Numerical Example 5.

In the diagram of spherical aberration shown in FIG. 10, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 10, the solid line represents values in the sagittal image plane, and the dashed line represents values in the meridional image plane.

As is apparent from the diagrams in FIG. 10, Numerical Example 5 exhibits good correctability for various aberrations and excellent imaging performance.

Figure 11:
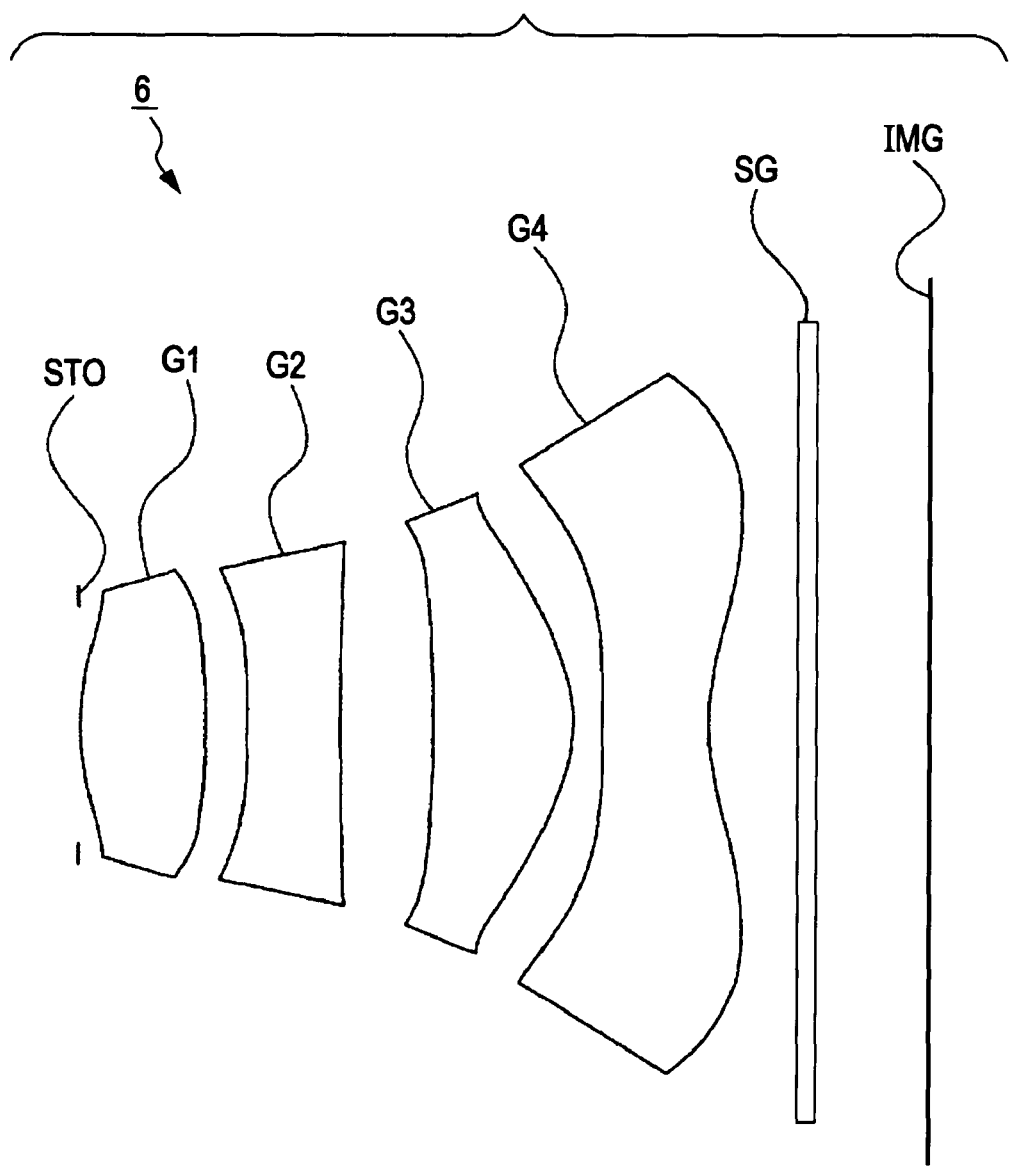
FIG. 11 shows the configuration of an image pickup lens according to a sixth exemplary embodiment of the present invention.

FIG. 11 shows the configuration of an image pickup lens 6 according to a sixth exemplary embodiment of the present invention.

As can be seen from FIG. 11, the image pickup lens 6 of the sixth exemplary embodiment includes four lens elements.

The image pickup lens 6 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 11 below summarizes lens data of Numerical Example 6 provided by applying specific values to the image pickup lens 6 according to the sixth exemplary embodiment, together with the F-number FNo, the focal length f of the entire lens system, the focal length f1 of the first lens element G1, the focal length f2 of the second lens element G2, and the diagonal total angle of view $2\omega$.

TABLE 11

FNo = 2.8
f = 5.5
f1 = 4.546
f2 = −7.286
$2\omega$ = 68.1°
Numerical Example 6

| Si Surface number | Ri Curvature radius | Di Interval | Ndi Refractive index | vdi Abbe number |
|---|---|---|---|---|
| 1 (STO) | ∞ | 0.030 | | |
| 2 | 2.986 | 1.015 | 1.530 | 55.8 |
| 3 | −11.249 | 0.369 | | |
| 4 | −10.224 | 0.761 | 1.632 | 23.0 |
| 5 | 8.783 | 0.745 | | |
| 6 | −22.542 | 1.145 | 1.530 | 55.8 |
| 7 | −1.503 | 0.250 | | |
| 8 | −19.028 | 0.850 | 1.530 | 55.8 |
| 9 | 1.643 | 0.750 | | |
| 10 | ∞ | 0.145 | 1.518 | 64.1 |
| 11 | ∞ | 0.939 | | |

In the image pickup lens 6, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 6 are shown in Table 12.

TABLE 12

Numerical Example 6

| Si Surface number | K Conic constant | A 4th | B 6th | C 8th |
|---|---|---|---|---|
| 1 (STO) | | | | |
| 2 | −1.115E+01 | 4.296E−02 | −3.135E−02 | 1.344E−02 |
| 3 | 9.485E+00 | −4.556E−02 | −8.844E−03 | 2.754E−03 |
| 4 | 0.000E+00 | −6.525E−02 | −5.542E−03 | 7.520E−03 |
| 5 | 1.361E+00 | −3.140E−02 | −1.536E−04 | 1.763E−03 |
| 6 | 1.397E+00 | −6.931E−03 | 9.289E−03 | −8.953E−03 |
| 7 | −4.117E+00 | −4.456E−02 | 2.770E−02 | −1.206E−02 |
| 8 | 0.000E+00 | −5.461E−02 | 1.381E−02 | −3.207E−03 |
| 9 | −6.450E+00 | −3.422E−02 | 5.812E−03 | −8.149E−04 |

| Si Surface number | D 10th | E 12th | F 14th | G 16th |
|---|---|---|---|---|
| 1 (STO) | | | | |
| 2 | −6.380E−03 | | | |
| 3 | −1.759E−03 | | | |
| 4 | −1.366E−05 | | | |
| 5 | −2.819E−05 | | | |
| 6 | 1.586E−03 | | | |
| 7 | 4.950E−03 | −2.125E−03 | 5.425E−04 | −4.981E−05 |
| 8 | 4.018E−04 | −1.167E−05 | | |
| 9 | 5.761E−05 | −1.774E−06 | | |

Figure 12:
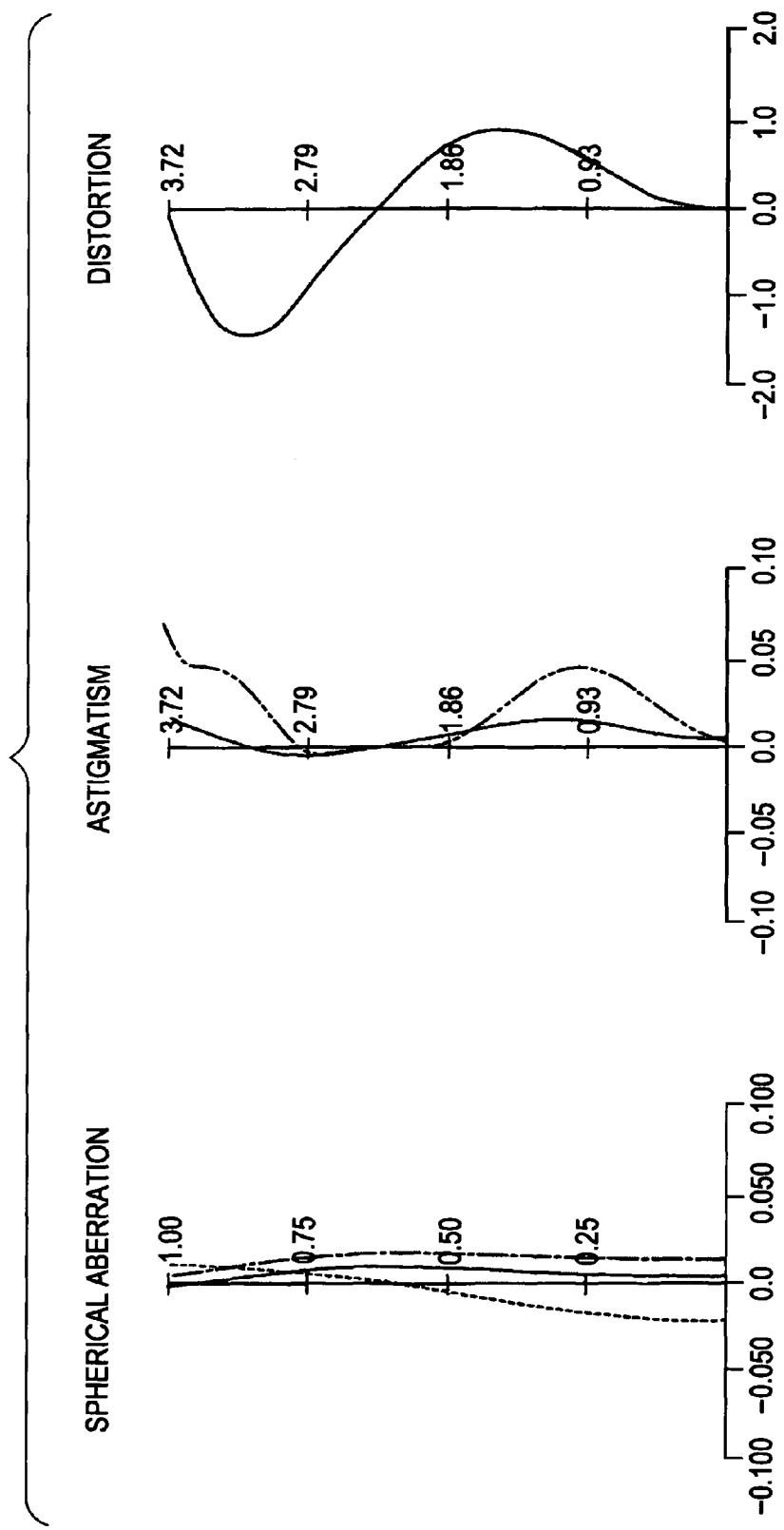
FIG. 12 includes diagrams showing spherical aberration, astigmatism, and distortion in a numerical example provided by applying specific values to the sixth exemplary embodiment.

FIG. 12 shows diagrams of aberrations occurring in Numerical Example 6.

In the diagram of spherical aberration shown in FIG. 12, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 12, the solid line represents values in the sagittal image plane, and the dashed line represents values in the meridional image plane.

As is apparent from the diagrams in FIG. 12, Numerical Example 6 exhibits good correctability for various aberrations and excellent imaging performance.

Figure 13:
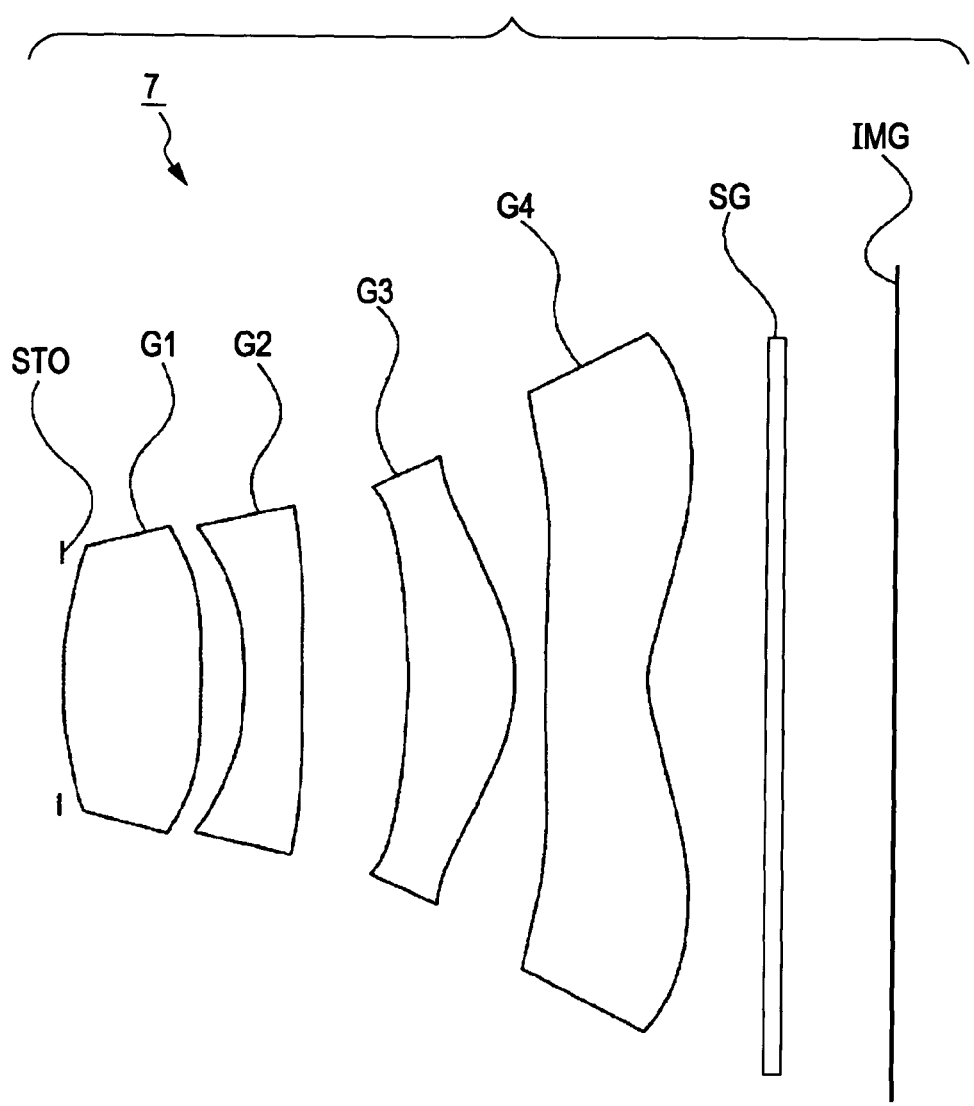
FIG. 13 shows the configuration of an image pickup lens according to a seventh exemplary embodiment of the present, invention.

FIG. 13 shows the configuration of an image pickup lens 7 according to a seventh exemplary embodiment of the present invention.

As can be seen from FIG. 13, the image pickup lens 7 of the seventh exemplary embodiment includes four lens elements.

The image pickup lens 7 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 13 below summarizes lens data of Numerical Example 7 provided by applying specific values to the image pickup lens 7 according to the seventh exemplary embodiment, together with the F-number FNo, the focal length f of the entire lens system, the focal length f1 of the first lens element G1, the focal length f2 of the second lens element G2, and the diagonal total angle of view 2ω.

TABLE 13

FNo = 2.8
f = 5.5
f1 = 4.203
f2 = −6.465
2ω = 67.1°
Numerical Example 7

| Si Surface number | Ri Curvature radius | Di Interval | Ndi Refractive index | vdi Abbe number |
|---|---|---|---|---|
| 1 (STO) | ∞ | 0.030 | | |
| 2 | 3.133 | 1.169 | 1.553 | 71.7 |
| 3 | −7.923 | 0.340 | | |
| 4 | −4.584 | 0.500 | 1.583 | 35.0 |
| 5 | 22.923 | 0.900 | | |
| 6 | −4.574 | 0.886 | 1.530 | 55.8 |
| 7 | −1.395 | 0.250 | | |
| 8 | 8.361 | 0.850 | 1.530 | 55.8 |
| 9 | 1.511 | 0.992 | | |
| 10 | ∞ | 0.145 | 1.518 | 64.1 |
| 11 | ∞ | 0.939 | | |

In the image pickup lens 7, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 7 are shown in Table 14.

TABLE 14

Numerical Example 7

| Si Surface number | K Conic constant | A 4th | B 6th | C 8th |
|---|---|---|---|---|
| 1 (STO) | | | | |
| 2 | −1.115E+01 | 3.821E−02 | −2.574E−02 | 1.112E−02 |
| 3 | 9.485E+00 | −4.512E−02 | −1.127E−02 | 1.546E−03 |
| 4 | 0.000E+00 | −7.636E−02 | −1.837E−02 | 1.482E−02 |
| 5 | 1.361E+00 | −2.918E−02 | −6.215E−03 | 4.799E−03 |
| 6 | 1.397E+00 | 2.169E−02 | 3.664E−03 | −5.215E−03 |
| 7 | −4.117E+00 | −4.922E−02 | 3.829E−02 | −1.355E−02 |
| 8 | 0.000E+00 | −4.923E−02 | 1.510E−02 | −3.111E−03 |
| 9 | −6.450E+00 | −3.022E−02 | 5.678E−03 | −7.983E−04 |

| Si Surface number | D 10th | E 12th | F 14th | G 16th |
|---|---|---|---|---|
| 1 (STO) | | | | |
| 2 | −5.696E−03 | | | |
| 3 | −7.319E−04 | | | |
| 4 | −8.691E−04 | | | |
| 5 | −6.356E−04 | | | |
| 6 | 4.160E−04 | | | |
| 7 | 5.084E−03 | −2.121E−03 | 5.179E−04 | −4.705E−05 |
| 8 | 3.635E−04 | −1.720E−05 | | |
| 9 | 5.796E−05 | −1.755E−06 | | |

Figure 14:
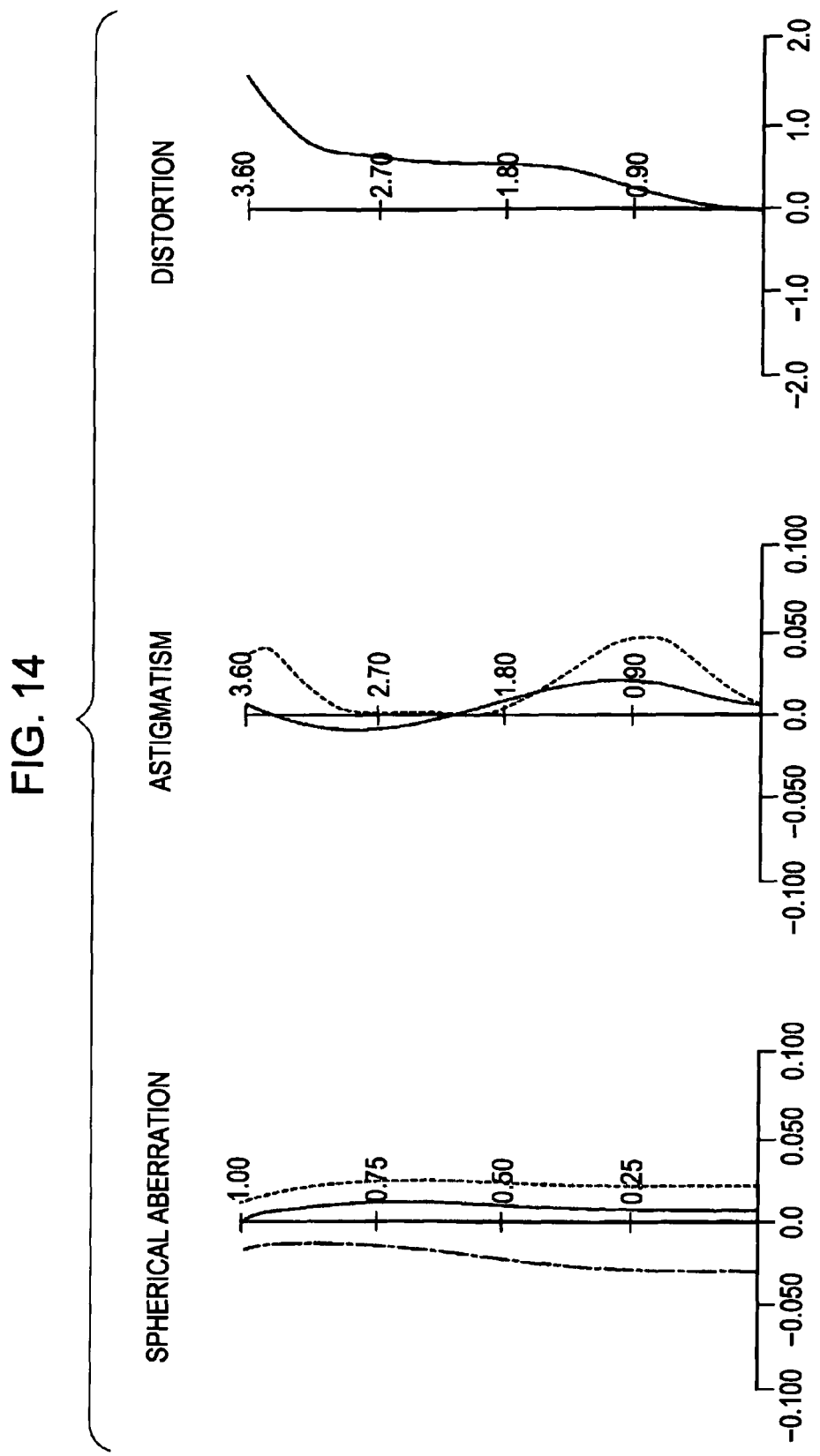
FIG. 14 includes diagrams showing spherical aberration, astigmatism, and distortion in a numerical example provided by applying specific values to the seventh exemplary embodiment.

FIG. 14 shows diagrams of aberrations occurring in Numerical Example 7.

In the diagram of spherical aberration shown in FIG. 14, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 14, the solid line represents values in the sagittal image plane, and the dashed line represents values in the meridional image plane.

As is apparent from the diagrams in FIG. 14, Numerical Example 7 exhibits good correctability for various aberrations and excellent imaging performance.

Figure 15:
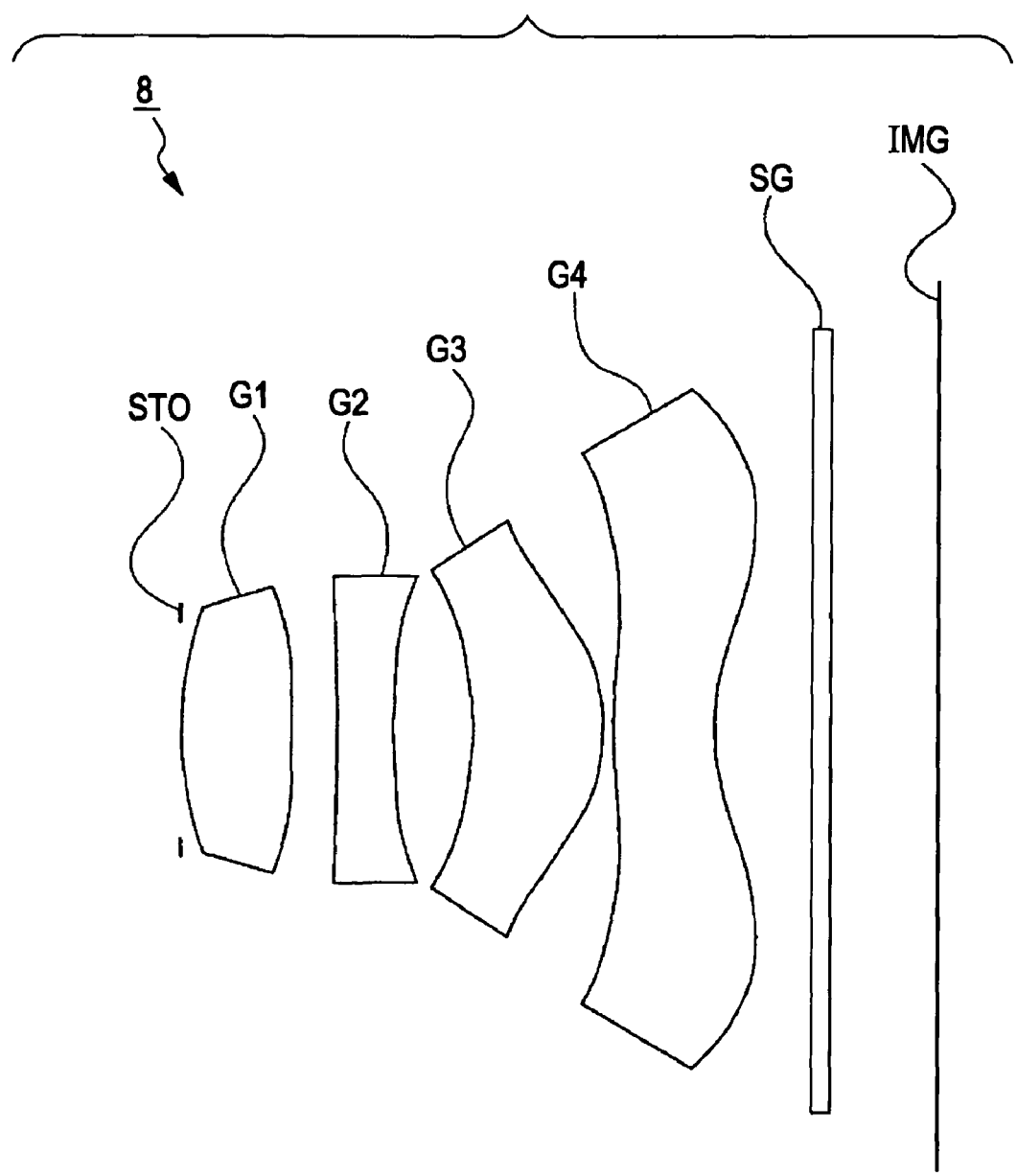
FIG. 15 shows the configuration of an image pickup lens according to an eighth exemplary embodiment of the present invention.

FIG. 15 shows the configuration of an image pickup lens 8 according to an eighth exemplary embodiment of the present invention.

As can be seen from FIG. 15, the image pickup lens 8 of the eighth exemplary embodiment includes four lens elements.

The image pickup lens 8 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 15 below summarizes lens data of Numerical Example 8 provided by applying specific values to the image pickup lens 8 according to the eighth exemplary embodiment, together with the F-number FNo, the focal length f of the entire lens system, the focal length f1 of the first lens element G1, the focal length f2 of the second lens element G2, and the diagonal total angle of view 2ω.

TABLE 15

FNo = 2.8
f = 5.2
f1 = 4.266
f2 = −11.197
2ω = 69.8°
Numerical Example 8

| Si Surface number | Ri Curvature radius | Di Interval | Ndi Refractive index | vdi Abbe number |
|---|---|---|---|---|
| 1 (STO) | ∞ | 0.030 | | |
| 2 | 2.770 | 0.939 | 1.553 | 71.6 |
| 3 | −14.356 | 0.364 | | |
| 4 | −188.126 | 0.500 | 1.632 | 23.0 |
| 5 | 7.439 | 0.700 | | |
| 6 | −2.670 | 1.083 | 1.530 | 55.8 |
| 7 | −1.315 | 0.100 | | |
| 8 | 6.074 | 0.850 | 1.530 | 55.8 |
| 9 | 1.410 | 0.850 | | |
| 10 | ∞ | 0.145 | 1.518 | 64.1 |
| 11 | ∞ | 0.939 | | |

In the image pickup lens 8, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 8 are shown in Table 16.

TABLE 16

Numerical Example 8

| Si Surface number | K Conic constant | A 4th | B 6th | C 8th |
|---|---|---|---|---|
| 1 (STO) | | | | |
| 2 | −1.115E+01 | 4.967E−02 | −3.822E−02 | 1.241E−02 |
| 3 | 9.485E+00 | −4.160E−02 | −7.062E−03 | 3.101E−03 |
| 4 | 0.000E+00 | −2.563E−02 | −5.510E−03 | 1.587E−02 |
| 5 | 1.361E+00 | 6.366E−03 | −1.714E−03 | 4.493E−03 |
| 6 | 1.397E+00 | 2.556E−02 | −2.532E−03 | −6.332E−03 |
| 7 | −4.117E+00 | −6.209E−02 | 3.449E−02 | −1.514E−02 |
| 8 | 0.000E+00 | −5.730E−02 | 1.462E−02 | −2.992E−03 |
| 9 | −6.450E+00 | −2.986E−02 | 5.418E−03 | −8.067E−04 |

| Si Surface number | D 10th | E 12th | F 14th | G 16th |
|---|---|---|---|---|
| 1 (STO) | | | | |
| 2 | −4.916E−03 | | | |
| 3 | −1.686E−03 | | | |
| 4 | −3.191E−03 | | | |
| 5 | 4.682E−04 | | | |
| 6 | 2.389E−03 | | | |
| 7 | 5.636E−03 | −1.937E−03 | 5.131E−04 | −5.573E−05 |
| 8 | 3.685E−04 | −1.799E−05 | | |
| 9 | 5.930E−05 | −1.917E−06 | | |

Figure 16:
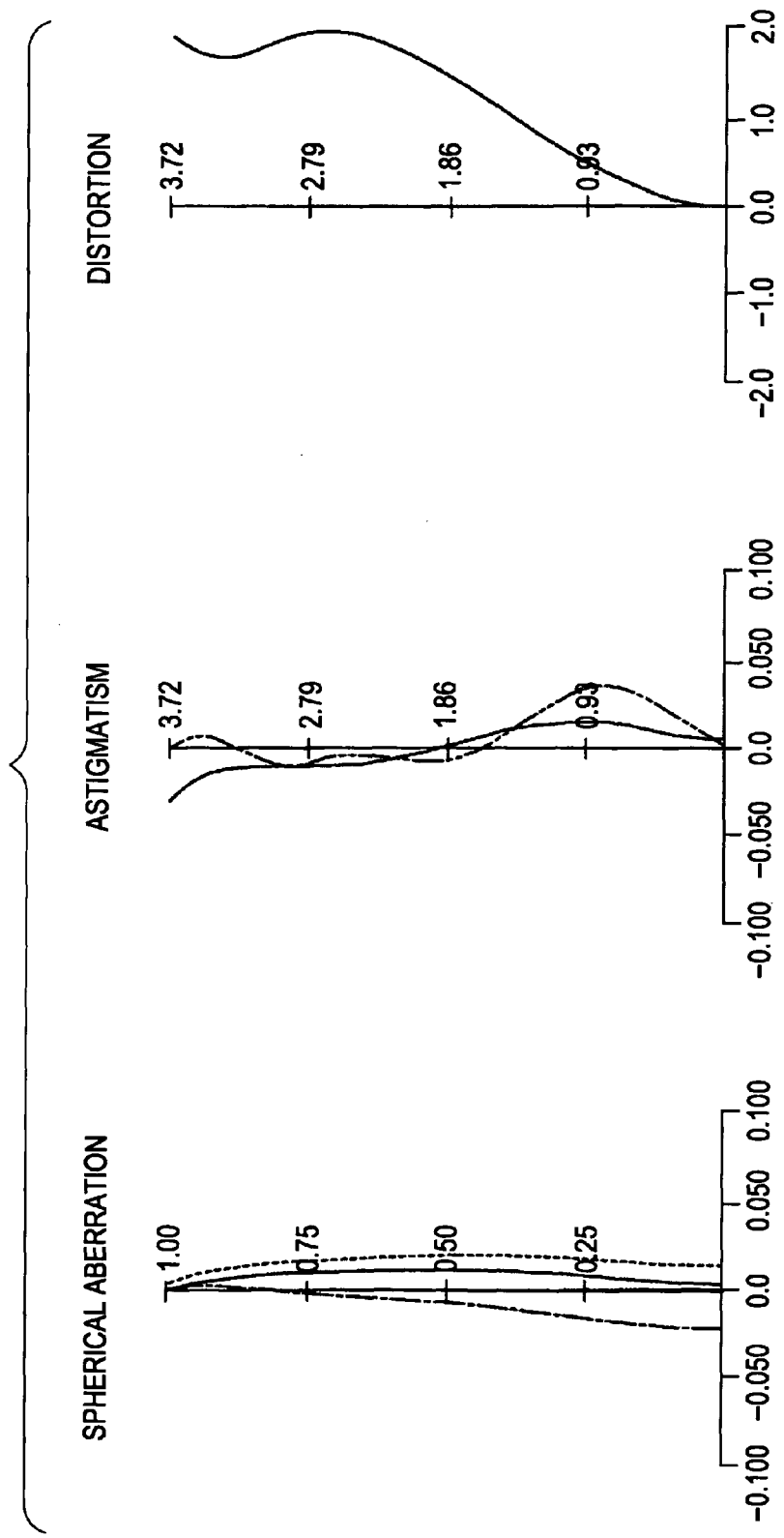
FIG. 16 includes diagrams showing spherical aberration, astigmatism, and distortion in a numerical example provided by applying specific values to the eighth exemplary embodiment.

FIG. 16 shows diagrams of aberrations occurring in Numerical Example 8.

In the diagram of spherical aberration shown in FIG. 16, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 16, the solid line represents values in the sagittal image plane, and the dashed line represents values in the meridional image plane.

As is apparent from the diagrams in FIG. 16, Numerical Example 8 exhibits good correctability for various aberrations and excellent imaging performance.

Figure 17:
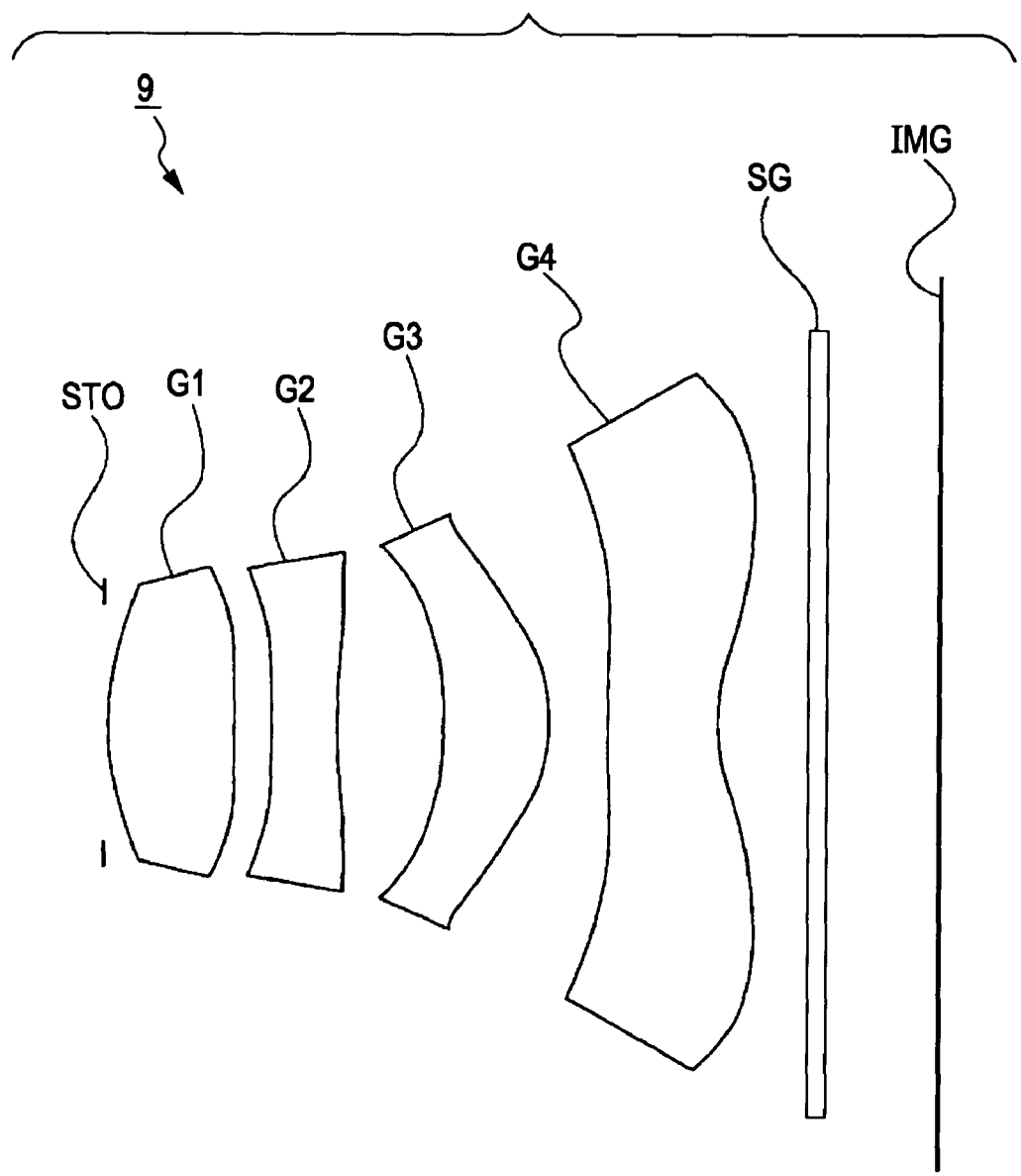
FIG. 17 shows the configuration of an image pickup lens according to a ninth exemplary embodiment of the present invention.

FIG. 17 shows the configuration of an image pickup lens 9 according to a ninth exemplary embodiment of the present invention.

As can be seen from FIG. 17, the image pickup lens 9 of the ninth exemplary embodiment includes four lens elements.

The image pickup lens 9 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 17 below summarizes lens data of Numerical Example 9 provided by applying specific values to the image pickup lens 9 according to the ninth exemplary embodiment, together with the F-number FNo, the focal length f of the entire lens system, the focal length f1 of the first lens element G1, the focal length f2 of the second lens element G2, and the diagonal total angle of view 2ω.

TABLE 17

FNo = 2.8
f = 5.8
f1 = 4.823
f2 = −10.245
2ω = 64.8°

Numerical Example 9

| Si Surface number | Ri Curvature radius | Di Interval | Ndi Refractive index | νdi Abbe number |
|---|---|---|---|---|
| 1 (STO) | ∞ | 0.030 | | |
| 2 | 2.685 | 1.047 | 1.530 | 55.8 |
| 3 | −50.508 | 0.300 | | |
| 4 | −624.645 | 0.567 | 1.632 | 23.0 |
| 5 | 6.612 | 0.900 | | |
| 6 | −3.197 | 0.873 | 1.530 | 55.8 |
| 7 | −1.569 | 0.526 | | |
| 8 | 8.521 | 0.900 | 1.530 | 55.8 |
| 9 | 1.835 | 0.760 | | |
| 10 | ∞ | 0.145 | 1.518 | 64.1 |
| 11 | ∞ | 0.939 | | |

In the image pickup lens 9, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 9 are shown in Table 18.

TABLE 18

Numerical Example 9

| Si Surface number | K Conic constant | A 4th | B 6th | C 8th |
|---|---|---|---|---|
| 1 (STO) | | | | |
| 2 | −1.115E+01 | 6.573E−02 | −4.067E−02 | 1.847E−02 |
| 3 | 9.485E+00 | −4.010E−02 | −1.211E−02 | 4.070E−03 |
| 4 | 0.000E+00 | −6.076E−02 | −1.677E−02 | 1.042E−02 |
| 5 | 1.361E+00 | −2.675E−02 | −8.166E−03 | 5.189E−03 |
| 6 | 1.397E+00 | 3.453E−03 | −6.413E−03 | −2.792E−03 |
| 7 | −4.117E+00 | −7.477E−02 | 3.070E−02 | −1.157E−02 |
| 8 | 0.000E+00 | −6.459E−02 | 1.769E−02 | −3.096E−03 |
| 9 | −6.450E+00 | −3.246E−02 | 5.896E−03 | −8.066E−04 |

| Si Surface number | D 10th | E 12th | F 14th | G 16th |
|---|---|---|---|---|
| 1 (STO) | | | | |
| 2 | −6.094E−03 | | | |
| 3 | −1.673E−03 | | | |
| 4 | −4.327E−04 | | | |
| 5 | −8.273E−04 | | | |
| 6 | 5.348E−04 | | | |
| 7 | 4.380E−03 | −1.944E−03 | 6.396E−04 | −7.550E−05 |
| 8 | 3.443E−04 | −2.657E−05 | 1.610E−06 | −6.848E−08 |
| 9 | 5.865E−05 | −1.886E−06 | | |

Figure 18:
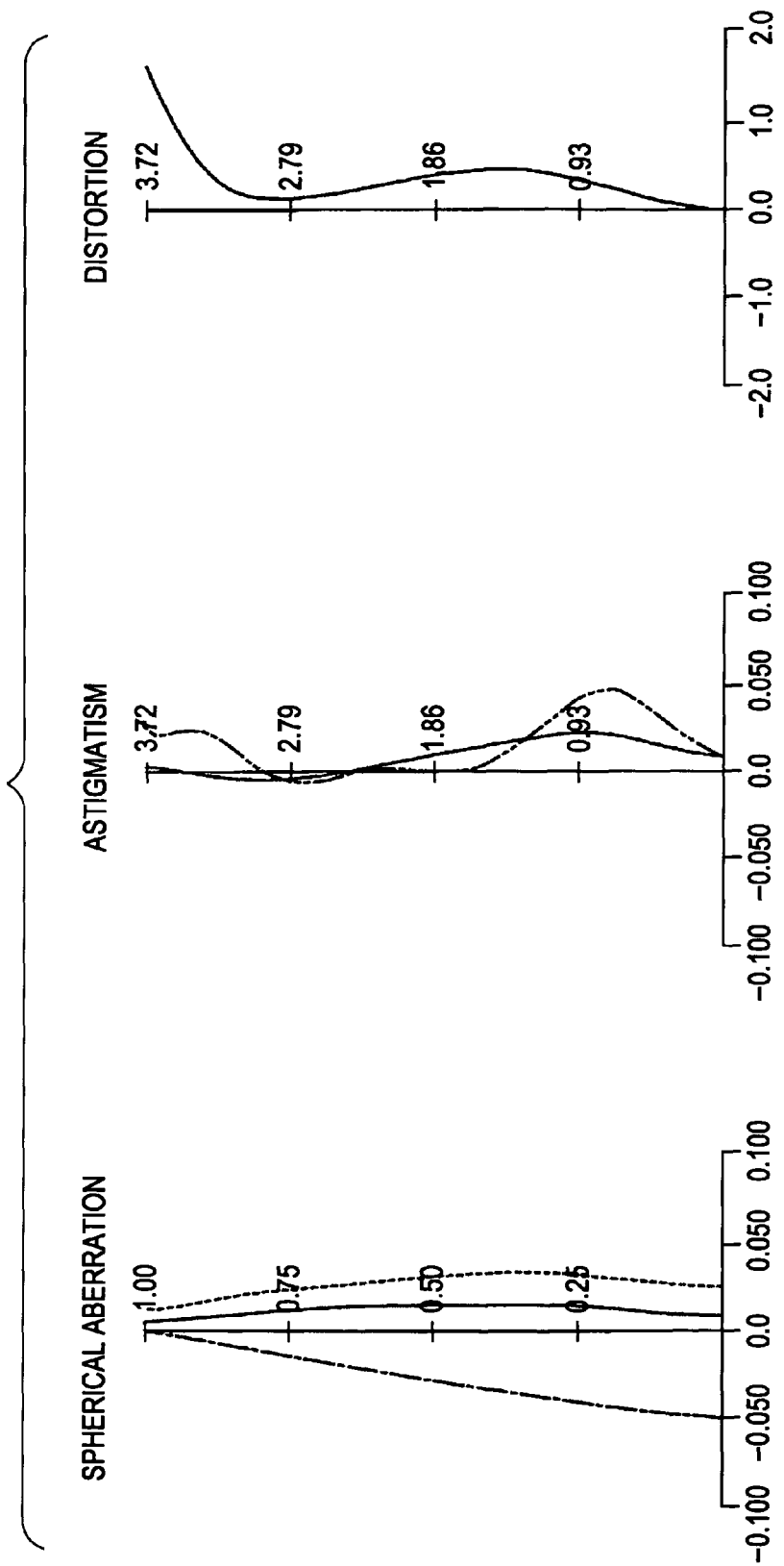
FIG. 18 includes diagrams showing spherical aberration, astigmatism, and distortion in a numerical example provided by applying specific values to the ninth exemplary embodiment.

FIG. 18 shows diagrams of aberrations occurring in Numerical Example 9.

In the diagram of spherical aberration shown in FIG. 18, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 18, the solid line represents values in the sagittal image plane, and the dashed line represents values in the meridional image plane.

As is apparent from the diagrams in FIG. 18, Numerical Example 9 exhibits good correctability for various aberrations and excellent imaging performance.

Figure 19:
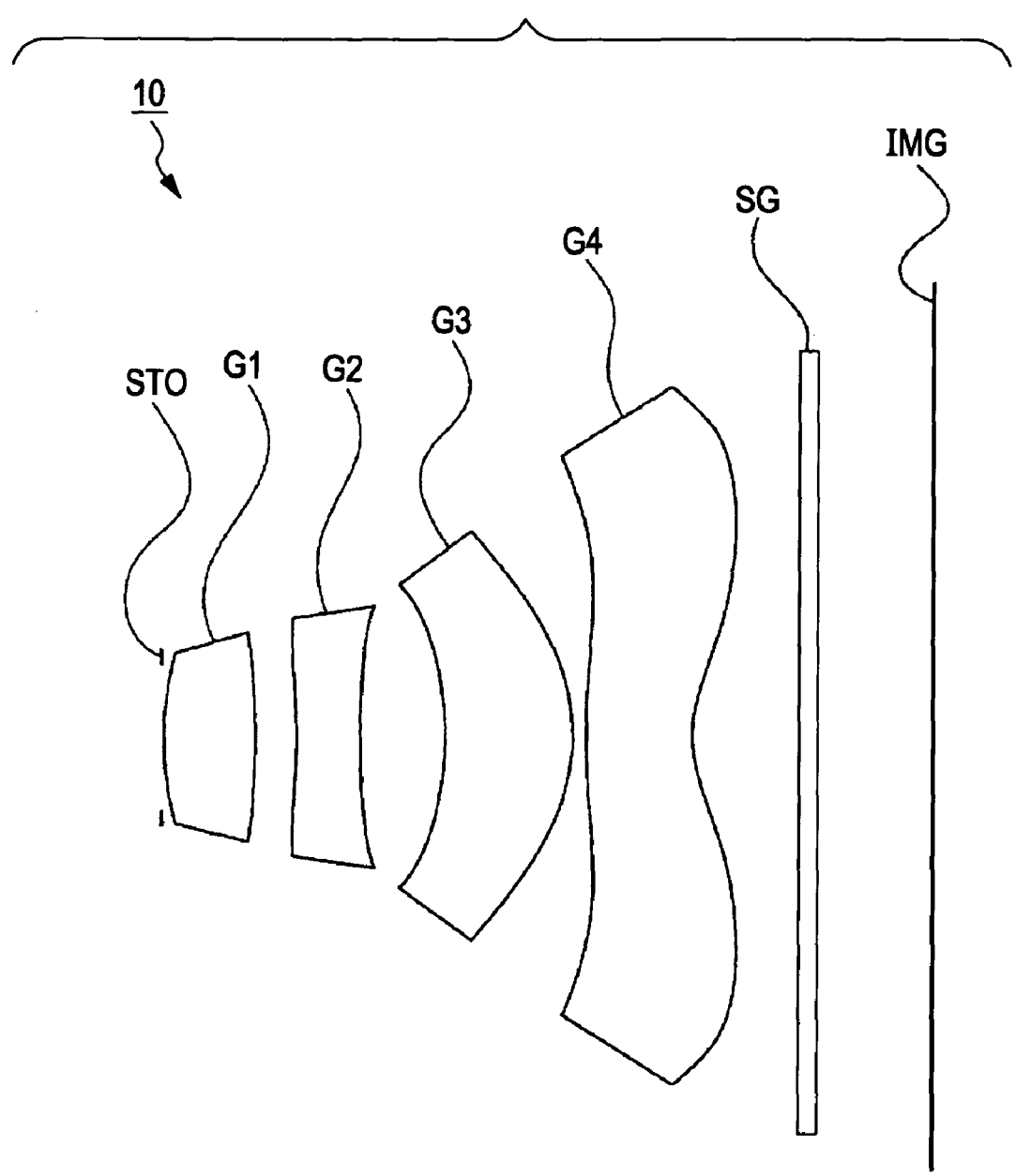
FIG. 19 shows the configuration of an image pickup lens according to a tenth exemplary embodiment of the present invention.

FIG. 19 shows the configuration of an image pickup lens 10 according to a tenth exemplary embodiment of the present invention.

As can be seen from FIG. 19, the image pickup lens 10 of the tenth exemplary embodiment includes four lens elements.

The image pickup lens 10 includes, in order from the object side, an aperture stop STO, a first lens element G1 having a positive refractive power, a second lens element G2 having a negative refractive power, a third lens element G3 having a positive refractive power, and a fourth lens element G4 having a negative refractive power.

The first lens element G1 has a biconvex shape. The second lens element G2 has a biconcave shape. The third lens element G3 has a meniscus shape whose concave surface faces the object side.

Both surfaces of the first lens element G1, both surfaces of the second lens element G2, both surfaces of the third lens element G3, and both surfaces of the fourth lens element G4 are aspherical.

A seal glass SG is disposed between the fourth lens element G4 and an image plane IMG.

Table 19 below summarizes lens data of Numerical Example 10 provided by applying specific values to the image pickup lens 10 according to the tenth exemplary embodiment, together with the F-number FNo, the focal length f of the entire lens system, the focal length f1 of the first lens element G1, the focal length f2 of the second lens element G2, and the diagonal total angle of view 2ω.

TABLE 19

FNo = 4.0
f = 5.1
f1 = 4.012
f2 = −9.469
2ω = 71.8°
Numerical Example 10

| Si Surface number | Ri Curvature radius | Di Interval | Ndi Refractive index | vdi Abbe number |
|---|---|---|---|---|
| 1 (STO) | ∞ | 0.030 | | |
| 2 | 2.580 | 0.732 | 1.553 | 71.7 |
| 3 | −14.655 | 0.336 | | |
| 4 | −344.136 | 0.500 | 1.632 | 23.0 |
| 5 | 6.157 | 0.700 | | |
| 6 | −2.573 | 1.068 | 1.530 | 55.8 |
| 7 | −1.281 | 0.100 | | |
| 8 | 5.433 | 0.850 | 1.530 | 55.8 |
| 9 | 1.351 | 0.850 | | |
| 10 | ∞ | 0.145 | 1.518 | 64.1 |
| 11 | ∞ | 0.939 | | |

In the image pickup lens 10, as described above, both surfaces (S2 and S3) of the first lens element G1, both surfaces (S4 and S5) of the second lens element G2, both surfaces (S6 and S7) of the third lens element G3, and both surfaces (S8 and S9) of the fourth lens element G4 are aspherical.

The fourth-, sixth-, eighth-, tenth-, twelfth-, fourteenth-, and sixteenth-order aspherical coefficients A, B, C, D, E, F, and G and the conic constant K of each of the aspherical surfaces in Numerical Example 10 are shown in Table 20.

TABLE 20

Numerical Example 10

| Si Surface number | K Conic constant | A 4th | B 6th | C 8th |
|---|---|---|---|---|
| 1 (STO) | | | | |
| 2 | −1.115E+01 | 6.062E−02 | −6.006E−02 | 2.032E−02 |
| 3 | 9.485E+00 | −4.818E−02 | −8.611E−03 | −3.694E−03 |
| 4 | 0.000E+00 | −2.163E−02 | −9.582E−04 | 1.788E−02 |
| 5 | 1.361E+00 | 1.382E−02 | −2.489E−03 | 7.942E−03 |
| 6 | 1.397E+00 | 3.563E−02 | −1.458E−02 | 1.167E−04 |
| 7 | −4.117E+00 | −6.274E−02 | 3.581E−02 | −1.595E−02 |
| 8 | 0.000E+00 | −5.756E−02 | 1.463E−02 | −3.005E−03 |
| 9 | −6.450E+00 | −3.080E−02 | 5.432E−03 | −8.120E−04 |

| Si Surface number | D 10th | E 12th | F 14th | G 16th |
|---|---|---|---|---|
| 1 (STO) | | | | |
| 2 | −8.936E−03 | | | |
| 3 | −2.250E−03 | | | |
| 4 | −4.822E−03 | | | |
| 5 | 3.891E−05 | | | |
| 6 | −5.727E−04 | | | |
| 7 | 5.514E−03 | −1.917E−03 | 5.220E−04 | −5.727E−05 |
| 8 | 3.635E−04 | −1.774E−05 | | |
| 9 | 5.911E−05 | −1.871E−06 | | |

Figure 20:
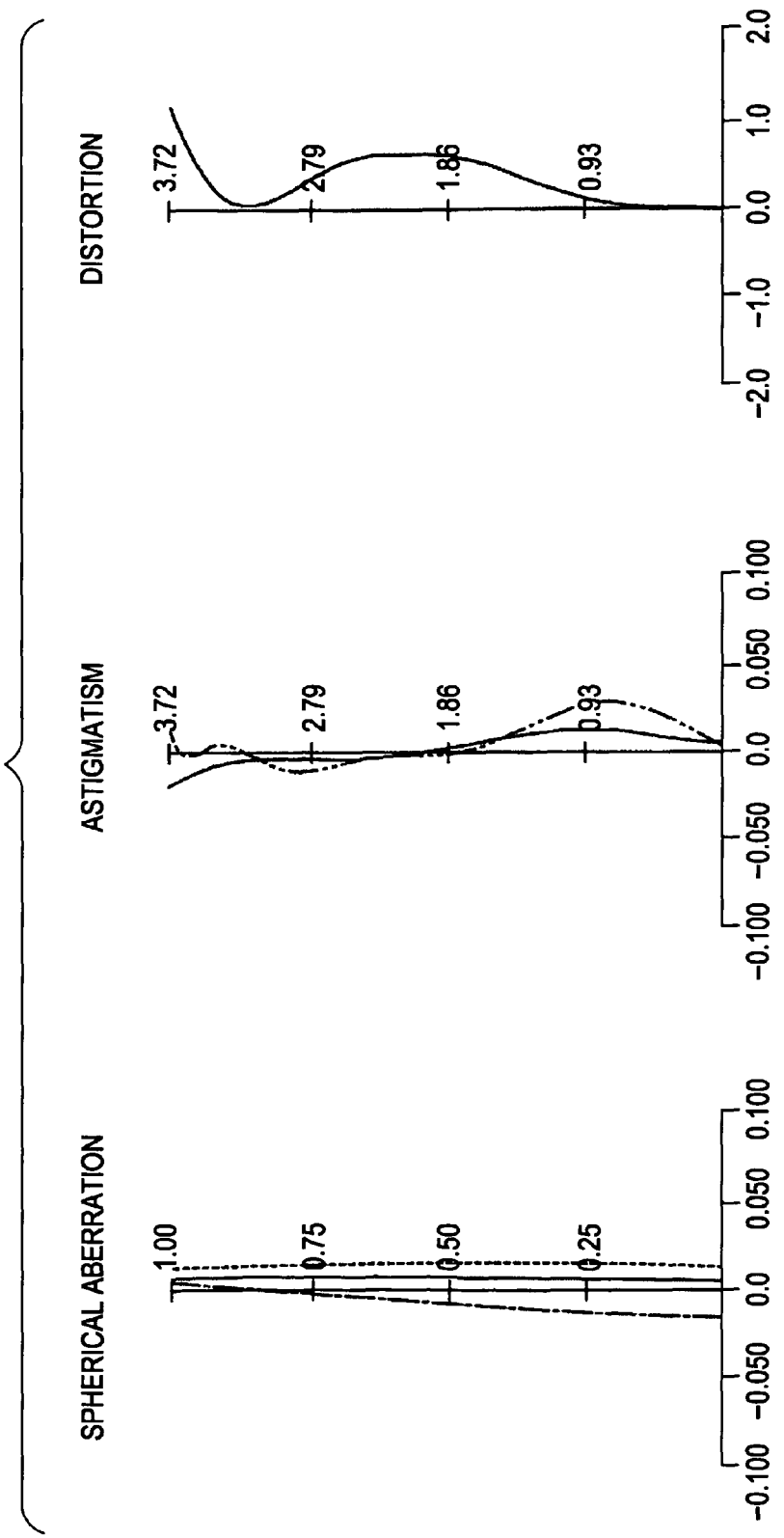
FIG. 20 includes diagrams showing spherical aberration, astigmatism, and distortion in a numerical example provided by applying specific values to the tenth exemplary embodiment.

FIG. 20 shows diagrams of aberrations occurring in Numerical Example 10.

In the diagram of spherical aberration shown in FIG. 20, the solid line represents values for d-line (having a wavelength of 587.6 nm), the dashed line represents values for c-line (having a wavelength of 656.3 nm), and the alternate long and short dashed line represents values for g-line (having a wavelength of 435.8 nm). In the diagram of astigmatism shown in FIG. 20, the solid line represents values in the sagittal image plane, and the dashed line represents values in the meridional image plane.

As is apparent from the diagrams in FIG. 20, Numerical Example 10 exhibits good correctability for various aberrations and excellent imaging performance.

Table 21 summarizes values for Conditional Expressions (1) to (3), i.e., f/|f2| for Conditional Expression (1), vd1−vd2 for Conditional Expression (2), and f1/|f2| for Conditional Expression (3), in each of the image pickup lenses 1 to 10 corresponding to Numerical Examples 1 to 10.

TABLE 21

| Conditional Expression | Example 1 | Example 2 | Example 3 | Example 4 | Example 5 |
|---|---|---|---|---|---|
| (1) 0.20 < f/|f2| < 0.90 | 0.85 | 0.27 | 0.40 | 0.38 | 0.63 |
| (2) vd1 − vd2 > 25 | 26.80 | 48.68 | 40.80 | 72.00 | 32.80 |
| (3) 0.20 < f1/|f2| < 0.70 | 0.65 | 0.24 | 0.36 | 0.33 | 0.45 |

| Conditional Expression | Example 6 | Example 7 | Example 8 | Example 9 | Example 10 |
|---|---|---|---|---|---|
| (1) 0.20 < f/|f2| < 0.90 | 0.76 | 0.85 | 0.47 | 0.56 | 0.54 |
| (2) vd1 − vd2 > 25 | 32.80 | 36.68 | 48.68 | 32.80 | 48.68 |
| (3) 0.20 < f1/|f2| < 0.70 | 0.62 | 0.65 | 0.38 | 0.47 | 0.42 |

As is obvious from Table 21, the image pickup lenses 1 to 10 each satisfy Conditional Expressions (1) to (3).

Next, a general embodiment of the image pickup apparatus according to the present invention will be described.

An image pickup apparatus according to the general embodiment of the present invention includes an image pickup lens and an image pickup device configured to convert an optical image formed by the image pickup lens into an electrical signal.

The image pickup lens included in the image pickup apparatus includes, in order from the object side to the image side, an aperture stop, a first lens element having a positive refractive power, a second lens element having a negative refractive power, a third lens element having a positive refractive power, and a fourth lens element having a negative refractive power. The second lens element has a biconcave shape. The third lens element has a meniscus shape whose concave surface faces the object side.

The second lens element having a biconcave shape causes off-axis rays, which may produce ghosts when totally reflected, to diffuse toward the outer periphery of the image pickup lens and thus prevents such rays from being incident on a solid-state image pickup device, such as a CCD or a CMOS. This is advantageous in correction of coma.

The third lens element having a positive refractive power and a meniscus shape is advantageous in correction of aberrations, specifically, field curvature and astigmatism. The third lens element also causes off-axis rays, which may produce ghosts when totally reflected, to diffuse toward the outer periphery of the image pickup lens and thus prevents such rays from being incident on a solid-state image pickup device, such as a CCD or a CMOS. Accordingly, deterioration of image quality is prevented.

The image pickup lens included in the image pickup apparatus according to the general embodiment satisfies the following conditional expressions:

$$0.20 < f/|f2| < 0.9 \quad (1)$$

$$vd1 - vd2 > 25 \quad (2)$$

where f denotes the focal length of the entire lens system, f2 denotes the focal length of the second lens element, vd1 denotes the Abbe number of the first lens element, and vd2 denotes the Abbe number of the second lens element.

Conditional Expression (1) defines an appropriate refractive power to be allocated to the second lens element relative to the refractive power of the entire lens system. The focal length of the second lens element is represented as an absolute value because the second lens element has a negative refractive power.

If the upper limit of Conditional Expression (1) is exceeded, the refractive power of the second lens element becomes too strong, making it difficult to correct off-axis aberrations, specifically, astigmatism and field curvature. This may also deteriorate ease of assembly in the manufacturing process.

If the lower limit of Conditional Expression (1) is exceeded, the refractive power of the second lens element becomes too weak, making it difficult to reduce the total length of the image pickup lens and thus preventing size reduction.

That is, with the image pickup lens satisfying Conditional Expression (1), off-axis aberrations can be corrected well. Accordingly, ease of assembly in the manufacturing process is improved. Moreover, even in the configuration including four lens elements, the total length of the image pickup lens can be reduced, leading to size reduction.

Conditional Expression (2) defines the Abbe numbers of the first and second lens elements for d-line.

If the first and second lens elements are made of materials (glass) having the Abbe numbers satisfying Conditional Expression (2), chromatic aberration can be corrected well without markedly increasing the refractive powers of the first and second lens elements. Since the refractive powers of the first and second lens elements are not very strong, marginal coma and field curvature are suppressed.

Next, an exemplary embodiment in which the image pickup apparatus according to the general embodiment of the present invention is applied to a mobile phone will be described with reference to FIGS. 21 to 23.

Figure 21:
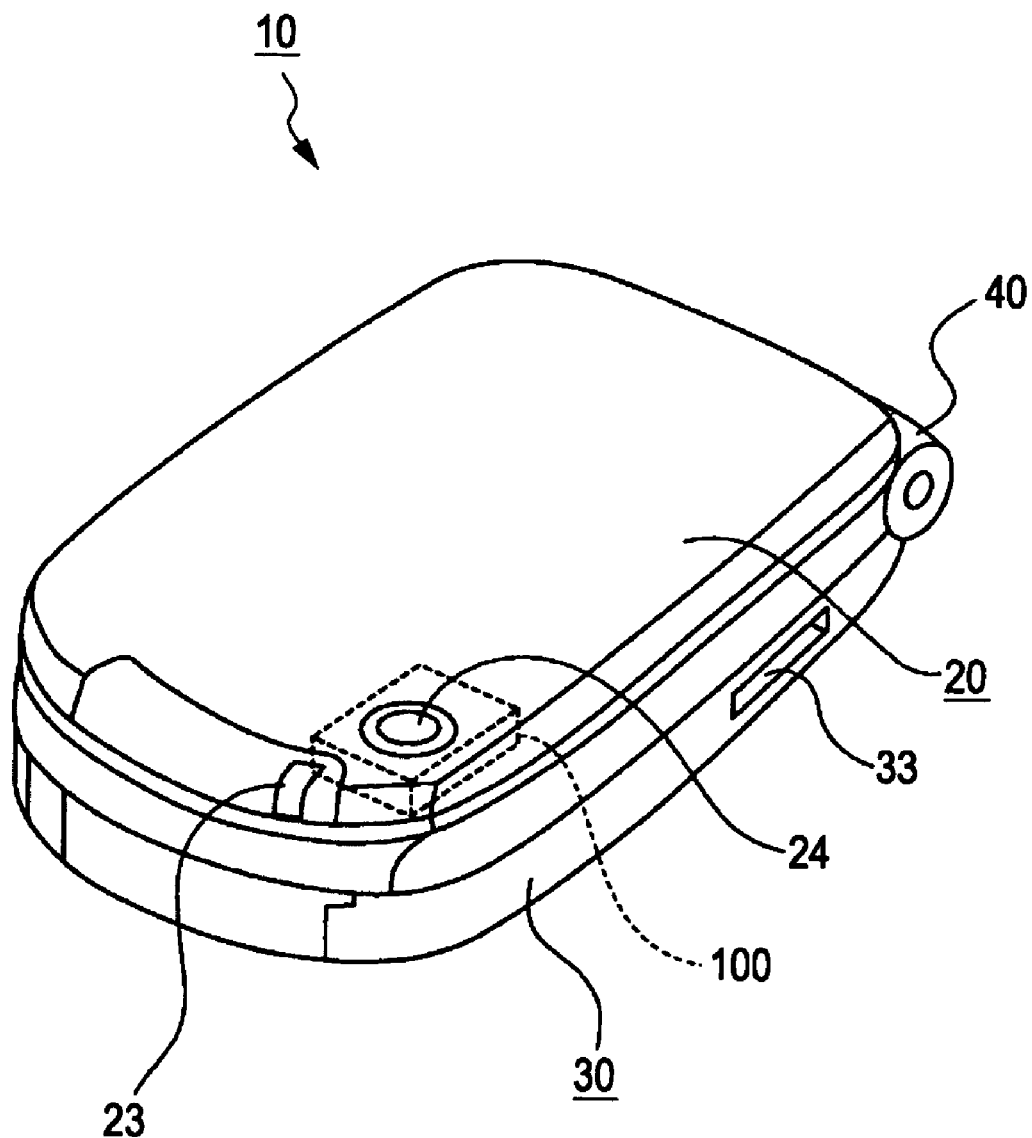
FIG. 21 shows, together with FIGS. 22 and 23, an exemplary mobile phone to which an image pickup apparatus according to a general embodiment of the present invention is applied, specifically, a perspective view of the mobile phone in a folded state.
Figure 22:
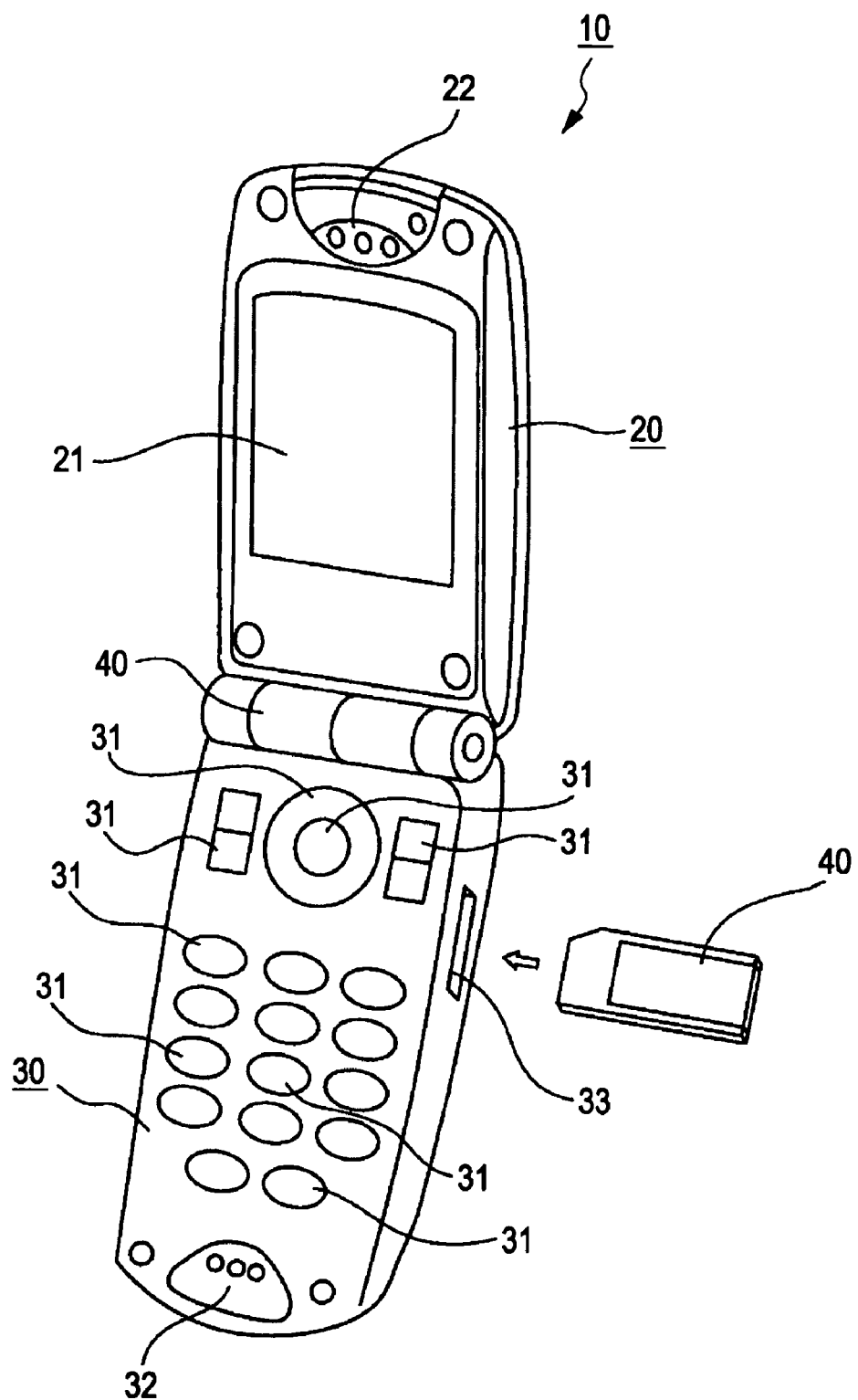
FIG. 22 is a perspective view of the mobile phone in an open state.

Referring to FIGS. 21 and 22, a mobile phone 10 includes a display unit 20, a body 30, and a hinge 40 coupling the display unit 20 and the body 30 so as to be foldable together. When the mobile phone 10 is carried, the display unit 20 and the body 30 are folded together, as shown in FIG. 21. When the mobile phone 10 is used for making a call, the display unit 20 and the body 30 are opened, as shown in FIG. 22.

The display unit 20 has on one surface thereof a liquid crystal display panel 21 and a speaker 22 provided at an upper portion with respect to the liquid crystal display panel 21. The display unit 20 also has in the inside thereof an image pickup unit 100. The image pickup unit 100 includes any of the image pickup lenses 1 to 10. The display unit 20 also has an infrared communication unit 23 configured to perform infrared communication.

The display unit 20 has on the other surface thereof a cover lens 24 provided on the object side with respect to the first lens element G1 included in the image pickup unit 100.

The body 30 has on one surface thereof various operation keys 31, such as numerical keys and a power key, and a microphone 32. The body 30 has on one side surface thereof a memory card slot 33, into and from which a memory card 40 is inserted and removed.

FIG. 23 is a block diagram showing the configuration of the mobile phone 10.

The mobile phone 10 includes a central processing unit (CPU) 50. The CPU 50 controls the entire operation of the mobile phone 10. For example, the CPU 50 extracts a control program stored in a read-only memory (ROM) 51 into a random access memory (RAM) 52, and controls the operation of the mobile phone 10 via a bus 53.

A camera control unit 60 controls the image pickup unit 100 so that a still image and a moving image are shot. The camera control unit 60 compresses information on an image that has been shot into a Joint-Photographic-Experts-Group (JPEG) format or a Moving-Picture-Experts-Group (MPEG) format, for example, and sends the compressed data to the bus 53. The image pickup unit 100 includes, in addition to any of the image pickup lenses 1 to 10, an image pickup device 101, such as a CCD or a CMOS.

The image information sent to the bus 53 is temporarily stored in the RAM 52, and is appropriately output to a memory card interface 41 so that the information is stored in the memory card 40, or to a display control unit 54 so that the image information is displayed on the liquid crystal display panel 21. Audio information recorded through the microphone 32, together with the image information, during the shooting operation is also temporarily stored in the RAM 52 or the memory card 40 via an audio codec 70. Then, simultaneously with image display on the liquid crystal display panel 21, the stored audio information is output via the audio codec 70 from the speaker 22.

Image information and audio information are appropriately output to an infrared communication interface 55, and is sent therefrom via the infrared communication unit 23 to an external apparatus having an infrared communication unit, such as a mobile phone, a personal computer, or a personal digital assistant (PDA).

In the mobile phone 10, a moving image or a still image is displayed on the liquid crystal display panel 21 in accordance with the image information stored in the RAM 52 or the memory card 40. To display such a moving image or a still image, a file stored in the RAM 52 or the memory card 40 is decoded or decompressed by the camera control unit 60, and image data obtained by the decoding or decompression is sent via the bus 53 to the display control unit 54.

A communication control unit 80 sends and receives radio waves to and from a base station via an antenna (not shown) provided inside the display unit 20. In an audio communication mode, the communication control unit 80 processes audio information that has been received and outputs the information via the audio codec 70 to the speaker 22, or receives via the audio codec 70 audio information collected through the microphone 32, processes the information in a predetermined manner, and sends the information.

With any of the image pickup lenses 1 to 10, the total optical length can be reduced, as described above, and therefore can be employed easily in an image pickup apparatus, such as the mobile phone 10, desired to have a thin body.

Although the foregoing exemplary embodiment concerns a case where the image pickup apparatus is applied to a mobile phone, the image pickup apparatus is not limited thereto and may be widely applied to any of other various digital input/output apparatuses, such as a digital video camera, a digital still camera, a personal computer equipped with a camera, and a PDA equipped with a camera.

The shapes and values of relevant elements described in the above embodiments are only exemplary and do not limit the technical scope of the present invention.

The present application contains subject matter related to that disclosed in Japanese Priority Patent Application JP 2008-214599 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup lens comprising, in order from an object side to an image side:
an aperture stop;
a first lens element having a positive refractive power;
a second lens element having a negative refractive power and a biconcave shape;
a third lens element having a positive refractive power and a meniscus shape whose concave surface faces the object side; and
a fourth lens element having a negative refractive power,
wherein the following conditional expressions are satisfied, $$0.20<f/|f2|<0.76$$

$$vd1-vd2>25$$

where f denotes the focal length of the entire lens system, f2 denotes the focal length of the second lens element, vd1 denotes the Abbe number of the first lens element, and vd2 denotes the Abbe number of the second lens element.

2. The image pickup lens according to claim 1, wherein the following conditional expression is satisfied, $$0.2<f1/|f2|<0.7$$

where f1 denotes the focal length of the first lens element.

3. The image pickup lens according to claim 1, wherein the aperture stop is positioned near the image side with respect to an apex of an object-side surface of the first lens element.

4. The image pickup lens according to claim 1, wherein both surfaces of the first lens element, both surfaces of the second lens element, both surfaces of the third lens element, and both surfaces of the fourth lens element are aspherical.

5. An image pickup apparatus comprising:
an image pickup lens; and
an image pickup device configured to convert an optical image formed by the image pickup lens into an electrical signal,
wherein the image pickup lens includes, in order from an object side to an image side,
an aperture stop;
a first lens element having a positive refractive power;
a second lens element having a negative refractive power and a biconcave shape;
a third lens element having a positive refractive power and a meniscus shape whose concave surface faces the object side; and
a fourth lens element having a negative refractive power,
wherein the following conditional expressions are satisfied, $$0.20<f/|f2|<0.76$$

$$vd1-vd2>25$$

where f denotes the focal length of the entire lens system, f2 denotes the focal length of the second lens element, vd1 denotes the Abbe number of the first lens element, and vd2 denotes the Abbe number of the second lens element.

6. The image pickup lens according to claim 1, wherein the first lens element has a biconvex shape.

7. The image pickup lens according to claim 5, wherein the first lens element has a biconvex shape.

8. The image pickup lens according to claim 1, wherein the following conditional expression is satisfied, $$vd1-vd2>40.$$

9. The image pickup lens according to claim 5, wherein the following conditional expression is satisfied, $$vd1-vd2>40.$$

10. The image pickup lens according to claim 1, wherein the following conditional expression is satisfied, $$0.20<f1/|f2|<0.48.$$

11. The image pickup lens according to claim 5, wherein the following conditional expression is satisfied, $$0.20<f1/|f2|<0.48.$$

* * * * *